US006960029B2

(12) United States Patent
Iijima et al.

(10) Patent No.: US 6,960,029 B2
(45) Date of Patent: Nov. 1, 2005

(54) PLASTIC OPTICAL FIBER END SURFACE PROCESSING METHOD, PROCESSING APPARATUS FOR THE METHOD, CUTTER FOR USE IN THE METHOD, AND PLASTIC OPTICAL FIBER CONNECTING METHOD

(75) Inventors: Yoshimi Iijima, Tokyo (JP); Hiroshi Kizukuri, Chiba (JP)

(73) Assignee: NHK Sales Company Limited, Tokyo (JP)

( * ) Notice: Subject to any disclaimer, the term of this patent is extended or adjusted under 35 U.S.C. 154(b) by 309 days.

(21) Appl. No.: 10/151,836

(22) Filed: May 21, 2002

(65) Prior Publication Data

US 2003/0049012 A1 Mar. 13, 2003

(30) Foreign Application Priority Data

| | | |
|---|---|---|
| Sep. 7, 2001 | (JP) | 2001-271765 |
| Oct. 2, 2001 | (JP) | 2001-306179 |
| Dec. 5, 2001 | (JP) | 2001-371465 |
| Dec. 28, 2001 | (JP) | 2001-400897 |

(51) Int. Cl.$^7$ .................... G02B 6/36
(52) U.S. Cl. .................... 385/85
(58) Field of Search .................... 385/31, 33, 35, 385/98, 85; 225/39, 43, 46; 65/387, 433

(56) References Cited

U.S. PATENT DOCUMENTS

| | | | | |
|---|---|---|---|---|
| 4,786,134 | A * | 11/1988 | Fort et al. | 385/85 |
| 5,062,682 | A * | 11/1991 | Marazzi | 385/85 |
| 5,325,452 | A * | 6/1994 | Stein et al. | 385/67 |
| 5,758,006 | A * | 5/1998 | Neely | 385/137 |
| 6,671,432 | B2 * | 12/2003 | Imada et al. | 385/33 |

FOREIGN PATENT DOCUMENTS

| | | |
|---|---|---|
| JP | 3546867 | 9/2001 |

* cited by examiner

*Primary Examiner*—Joseph Williams
*Assistant Examiner*—Peter Macchiarolo
(74) *Attorney, Agent, or Firm*—McGlew and Tuttle, P.C.

(57) ABSTRACT

A plastic optical fiber end surfaces processing method is disclosed which allows formation of not only a convex semi-spherical surface but also of an arbitrary profile such as a concave semi-spherical surface. In addition, an apparatus for use in the method, a cutter for the method, and a plastic optical fiber connection method are disclosed. At least the core portion of the end surface of a plastic optical fiber is cut into a semi-spherical surface by a semi-circular cutter, which is of a convex or a concave shape. This cutter is inserted into a through-hole of a holder and rotates therein. The plastic optical fiber is inserted into the through-hole of this holder, and end surface processing is effected by the rotating cutter.

8 Claims, 23 Drawing Sheets

(a)

(b)

( a )

( b )

(a)

(b)

(a)

(b)

(a)

(b)

(a)

(b)

Prior Art

PLASTIC OPTICAL FIBER END SURFACE PROCESSING METHOD, PROCESSING APPARATUS FOR THE METHOD, CUTTER FOR USE IN THE METHOD, AND PLASTIC OPTICAL FIBER CONNECTING METHOD

BACKGROUND OF THE INVENTION

1. Field of the Invention

The present invention relates to a plastic optical fiber (hereinafter simply referred to as optical fiber) end surface processing method for processing a plastic optical fiber end surface into a convex or concave semi-spherical surface, a processing apparatus for the method, a cutter for use in the method, and an optical fiber connecting method for connection between optical fibers, connection between an optical fiber and an apparatus, and connection between an optical fiber and a connection device such as a connector, and, in particular, an optical fiber connection method which involves little optical loss at a connecting portion.

2. Description of the Related Art

Conventionally, when processing an optical fiber end surface into a spherical surface, heat is usually applied for end surface processing. For example, while maintaining an optical fiber in a vertical position, its forward end is heated by a high heat source such as a flame and liquefied, the end surface being formed into a convex semi-spherical end surface by surface tension. In this method, however, the heating is not conducted uniformly, so that the convex semi-spherical profile lacks reproducibility. Further, the end surface disadvantageously involves generation of flaws, adhesion of dirt, and the like.

In order to solve the above problems, there has been proposed an optical fiber end surface processing apparatus, which comprises, as shown in FIGS. 28A, 28B, 28C, and 28D, a fixing device (not shown) for fixing an optical fiber 21 having a predetermined length of an end portion exposed, a lens forming mold 53 which is heated at least when pressed against the forward end of the end portion of the optical fiber 21, a rapid cooling means 54 which is integrated with the lens forming mold 53 and moves with the same and which forcibly cools the end portion of the optical fiber 21 while the lens forming mold 53 is being pressed against the forward end of the optical fiber end portion or after the lens forming mold 53 is separated from the end portion of the optical fiber, and a conveying means (not shown) for pressing and separating the lens forming mold 53 and the rapid cooling means 54 against and from the forward end of the optical fiber end portion.

Further, in this optical fiber end surface processing apparatus, the optical fiber 21 whose end portion is exposed and which is equipped with a jacket 23 is fixed by a fixing device (not shown) (FIG. 28A); the lens forming mold 53 and the rapid cooling means 54 are pressed against the forward end of the optical fiber 21 by the conveying means (not shown) for heating to soften/melt a part of the end portion to form it into a lens profile (FIG. 28B); the end portion of the optical fiber 21 is forcibly cooled by the rapid cooling means 53 (FIG. 28C); and the mold 53 and the rapid cooling means 54 are separated from the forward end of the optical fiber 21 (FIG. 28D) to thereby obtain an optical fiber with a lens 55.

This apparatus makes it possible to form a lens (a semi-spherical surface) at the forward end of an optical fiber easily, efficiently and at low cost. It can form the convex surface with a satisfactory reproducibility, and advantageously hardly involves generation of flaws or adhesion of dirt.

However, while the above conventional optical fiber end surface processing apparatus utilizing heat is suitable for the formation of a convex semi-spherical surface, it is not applicable to the formation of other profiles such as a concave semi-spherical surface.

SUMMARY OF THE INVENTION

It is accordingly a first object of the present invention to provide an optical fiber end surface processing method, an apparatus for use in the method, and a cutter for the processing which allow formation of not only a convex semi-spherical surface but also an arbitrary profile such as a concave semi-spherical surface.

An optical fiber consists of a core portion at the center and a clad portion in the outer periphery thereof, which is covered with a jacket, the core portion consisting of an optical fiber being formed of plastic. Thus, while the conventional optical fiber end surface processing apparatus utilizing heat can form the end surface of the core portion into a semi-spherical (lens-like) profile, it cannot process the end surfaces of the clad portion and the jacket. However, depending on the way the optical fiber is used, it may be desired that the end surfaces of the clad portion and the jacket be processed too.

In view of this, it is a second object of the present invention to provide an optical fiber end surface processing method, an apparatus for use in the method, and a cutter for the processing which allow end surface processing of not only the core portion of an optical fiber but also selectively of the clad portion and the jacket of the same.

While the conventional optical end surface processing method utilizes heat, the present invention provides a method not based on heating. It is accordingly a third object of the present invention to provide a novel optical fiber end surface processing method according to which the end surface of an optical fiber is processed by cutting with a cutter (cutting tool), a processing apparatus, and a cutter for the processing.

The above conventional optical fiber end surface processing apparatus is intended for a single-core optical fiber, and is not designed to simultaneously process the plastic optical fibers of a multiple plastic optical fiber.

In view of this, it is a fourth object of the present invention to provide an optical fiber end surface processing apparatus for multiple plastic optical fibers which is capable of simultaneously cutting the respective end surfaces of the plastic optical fibers of a multiple plastic optical fiber.

Conventionally, connection of optical fibers is effected, for example, by melting the core portions of optical fiber connection end portions by heating, or by providing terminal units at the connection end portions of optical fibers, or by using connection devices, such as connectors and holders.

However, the connection method in which the core portions of the optical fiber connection end portions are fused requires skill. Further, it requires an apparatus for fusing. As for the connection method in which terminal units are provided at the connection end portions of the optical fibers, there are limitations regarding the optical fiber connecting positions, which means it is not applicable to all connection methods. As for the connection method using connection devices such as connectors and holders, it more or less involves optical loss at the connecting portion, and is not applicable to all connection methods. Further, it requires preparation of connection devices.

In view of this, it is a fifth object of the present invention to provide an optical fiber connection method which allows optical fibers to be connected very easily and which involves very little optical loss at the optical fiber connecting portion.

In order to achieve the above-mentioned objects, according to the present invention, there is provided an optical fiber end surface processing method, characterized in that at least a core portion of an optical fiber end surface is cut into a semi-spherical surface by means of a semi-circular cutter.

Concretely, in the optical fiber end surface processing method, it is characterized in that a cutter is inserted halfway into a through-hole of a holder from one side and adapted to rotate, and an optical fiber is inserted from the other side, at least a core portion of an end surface of the optical fiber being cut into a semi-spherical surface by the cutter in the through-hole of the holder.

Also, in the optical fiber end surface processing method, the semi-circular cutter is of a convex or concave semi-circular shape, and the end surface of the optical fiber is cut into a convex or concave semi-spherical surface.

Also, there is provided an optical fiber end surface processing apparatus, characterized by comprising: a motor; a cutter connected to a motor driving shaft directly or through the intermediation of a connection member; and a holder having a through-hole into which the cutter is inserted halfway, wherein an optical fiber is inserted into the through-hole of the holder from one side, and wherein at least a core portion of an end surface of the plastic optical fiber is cut by the rotating cutter.

Also, there is provided a multiple plastic optical fiber end surface processing apparatus, characterized in that: there are provided in parallel a first rotation shaft connected to a connection member connected to a motor driving shaft and adapted to rotate and one or a plurality of second rotation shafts connected to the motor or the first rotation shaft through the intermediation of a transmission mechanism and adapted to rotate; holders having through-holes are detachably mounted to the first and second rotation shafts; cutters are detachably put in the through-holes of the holders; optical fibers of a multiple plastic optical fiber are inserted from one side into the through-holes of the holders arranged in parallel; and at least core portions of the optical fiber end surfaces are simultaneously cut by the rotating cutters.

Also, there is provided a multiple plastic optical fiber end surface processing apparatus, characterized in that: there are provided in parallel a first rotation shaft connected to a connection member connected to a motor driving shaft and adapted to rotate and one or a plurality of second rotation shafts connected to the motor or the first rotation shaft through the intermediation of a transmission mechanism and adapted to rotate; holders having through-holes are detachably fastened to forward end portions of the first and second rotation shafts; cutters are situated in the through-holes of the holders and detachably fastened to the forward ends of the first and second rotation shafts; optical fibers of a multiple plastic optical fiber are inserted from one side into the through-holes of the holders arranged in parallel; and at least core portions of the optical fiber end surfaces are simultaneously cut by the rotating cutters.

In the optical fiber end surface processing apparatus (including an end surface processing apparatus for a multiple optical fiber), it is preferable that the holder has a window open at a position where the optical fiber end surface is cut by the cutter, since chips generated during the surface processing can be discharged therethrough. Also, the connection member is a coupling connected to the motor driving shaft.

Further, there is provided an optical fiber end surface processing apparatus, characterized in that at least the portion of the cutter corresponding to the core portion is of a concave or convex semi-circular shape to cut at least the core portion of the optical fiber end surface into a convex or concave semi-spherical surface. One or a plurality of cutters are formed in the semi-circular shape.

Also, there is provided an optical fiber end surface processing cutter for cutting an end surface of an optical fiber into a predetermined profile, characterized in that the total length of the cutter substantially corresponds to the diameter of the optical fiber, and that the cutting edge shape is symmetrical with respect to the center thereof, one half of the cutting edge with respect to the center having a portion nearer to the center and a portion on the outer side which have different cutting edge angles.

Also, there is provided an optical fiber end surface processing cutter for cutting an end surface of a plastic optical fiber into a predetermined profile, characterized in that: the total length of the cutter corresponds to the diameter of the optical fiber; the cutting edge is formed in only one half of the cutter with respect to the center thereof; and the other half having no cutting function, the cutting edge of the one half having a portion nearer to the center and a portion on the outer side which have different cutting edge angles.

Also, there is provided an optical fiber end surface processing cutter for cutting an end surface of an optical fiber into a predetermined profile, characterized in that there is provided a cutter having a length corresponding to the radius of the plastic optical fiber and adapted to rotate while abutting the portion of the optical fiber corresponding to the radius thereof with respect to the center, the cutting edge of this cutter having a portion nearer to the center and a portion on the outer side which have different cutting edge angles.

Also, in the optical fiber end surface processing cutter, the portion of the cutting edge of the cutter on the outer side exhibits an angle more acute than that of the portion nearer to the center. Also, the length of the portion nearer to the center of the cutting edge exhibiting different angles corresponds to the radius of the core portion of the plastic optical fiber, and the length of the portion thereof on the outer side corresponds to the thickness of the portion of the optical fiber other than the core portion.

Also, there is provided an optical fiber connection method, characterized in that in an optical fiber connecting portion, connection is effected, with a connection end surface of an optical fiber formed as a concave or convex semi-spherical surface. Concretely, the connection end surface of one optical fiber is formed as a flat surface, and the connection end surface of the other optical fiber is formed as a concave or convex semi-spherical surface, connection being effected with the connection end surfaces of the two optical fibers being opposed to each other.

Also, in the optical fiber connection method, the connection end surface of one optical fiber is formed as a concave semi-spherical surface, and the connection end surface of the other optical fiber is formed as a convex semi-spherical surface, connection being effected with the connection end surfaces of the two optical fibers being opposed to each other.

Also, in the optical fiber connection method, an end surface of an optical fiber is formed as a concave or convex semi-spherical surface, and connection is effected with a material of a different refractive index being provided at this semi-spherical end surface. The material of a different refractive index is of a spherical or concave-lens-like shape.

BRIEF DESCRIPTION OF THE DRAWINGS

In the accompanying drawing:

FIGS. 20A and 20B are enlarged sectional explanatory views illustrating a first embodiment of the optical fiber connection method of the present invention, of which FIG. 20A shows end surface profiles and FIG. 20B shows a connection example;

FIGS. 21A and 21B are enlarged sectional explanatory views illustrating a second embodiment of the optical fiber connection method of the present invention, of which FIG. 21A shows end surface profiles and FIG. 21B shows a connection condition;

FIGS. 22A and 22B are enlarged sectional explanatory views illustrating a third embodiment of the optical fiber connection method of the present invention, of which FIG. 22A shows end surface profiles and FIG. 22B shows a connection condition;

FIGS. 23A and 23B are enlarged sectional explanatory views illustrating a fourth embodiment of the optical fiber connection method of the present invention, of which FIG. 20A shows a connection unit and FIG. 20B shows a connection example;

FIGS. 26A and 26B are enlarged sectional explanatory views illustrating a sixth embodiment of the optical fiber connection method of the present invention, of which FIG. 26A shows a formation process and FIG. 26B shows a completed state;

DESCRIPTION OF THE PREFERRED EMBODIMENTS

Figure 1:
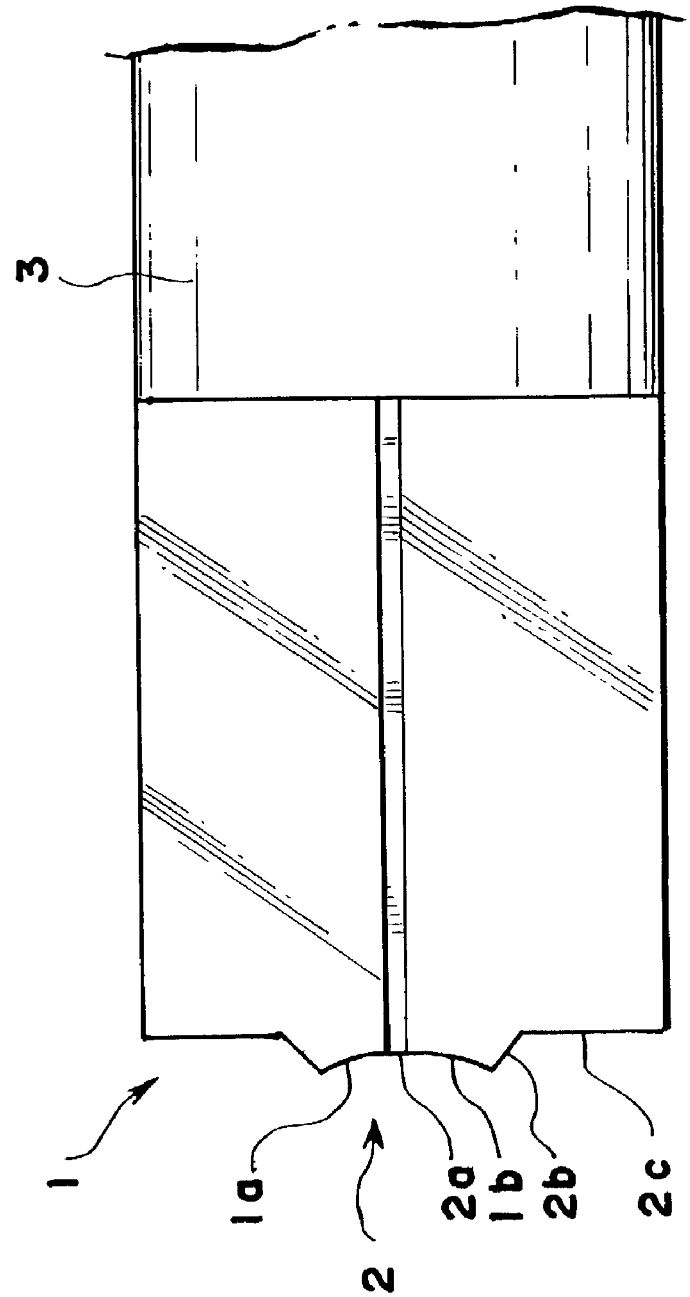
FIG. 1 is an enlarged front view showing a cutter for optical fiber end surface processing according to an embodiment of the present invention.
Figure 2:
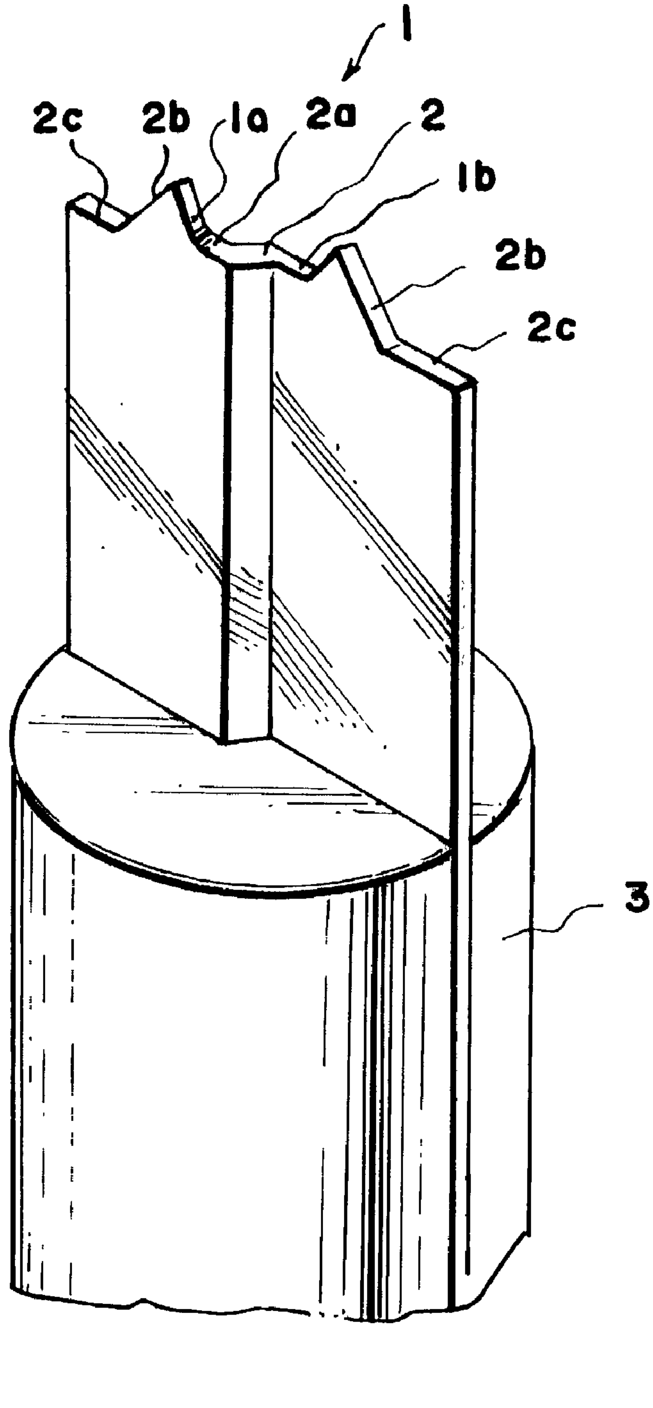
FIG. 2 is an enlarged perspective view of a main portion of a cutter for optical fiber end surface processing according to an embodiment of the present invention.

Embodiments of the present invention will now be described in detail with reference to the drawings. FIG. 1 is an enlarged front view showing a cutter for optical fiber end surface processing according to an embodiment of the present invention, and FIG. 2 is an enlarged perspective view of a main portion of the same.

In the drawings, a cutter 1 is provided at the forward end of a shaft portion (body portion) 3. In this embodiment, two cutters 1*a* and 1*b* form a semi-circular shape. More specifically, as shown in FIGS. 1 and 2, the cutting edge 2 of the cutter 1 has at its center a semi-circular recess 2*a*, which is connected to inclined portions 2*b*, which are connected to vertical portions 2*c*.

This cutter 1 is rotated, and the end surface of an optical fiber is opposed to and brought into contact with the rotating cutter 1 to thereby process the optical fiber end surface. In this case, the profile of the optical fiber end surface corresponds to the shape of the cutter 1, i.e., the end surface profile as shown in FIG. 3A is obtained. In the drawing, numeral 21 indicates a plastic optical fiber, numeral 22 indicates a core portion, numeral 23 indicates a clad portion, and numeral 24 indicates a jacket. Thus, by using the cutter 1 of this embodiment, only the end surface of the central core portion 22 is processed into a semi-spherical (lens-like) profile, and clad portion 23 exhibits an inclined (tapered) surface, the jacket 24 being flat.

When the shape of the cutting edge 2 of the cutter 1 is a concave semi-circular one, not only the core portion 22 but the entire end surface of the optical fiber 21, including the clad portion 23 and the jacket 24, is processed into a convex semi-spherical end surface, as shown in FIG. 3B.

As can be seen from the above description, by changing the shape of the cutter 1, it is possible to arbitrarily change the cut profile of the optical fiber end surface. Thus, it will be understood that it is also possible to form the optical fiber end surface as a concave semi-spherical profile.

While in this embodiment the cutter 1 is formed by two cutters 1*a* and 1*b*, as shown in FIG. 2, it is also possible for the cutter 1 to be formed of a single cutter or three or more cutters.

Figure 4:
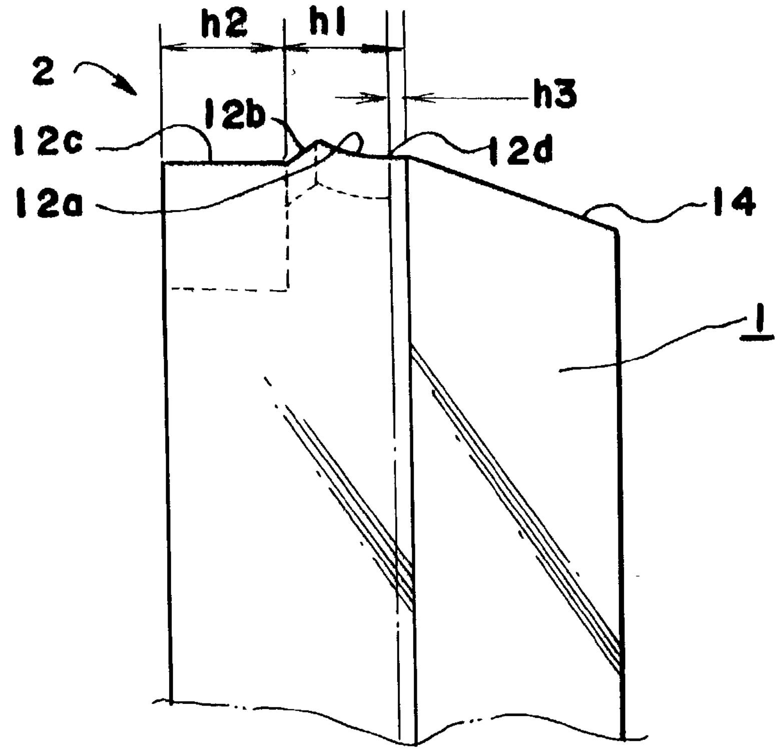
FIG. 4 is a front explanatory view of a cutter for an optical fiber end surface processing according to another embodiment of the present invention.
Figure 5:
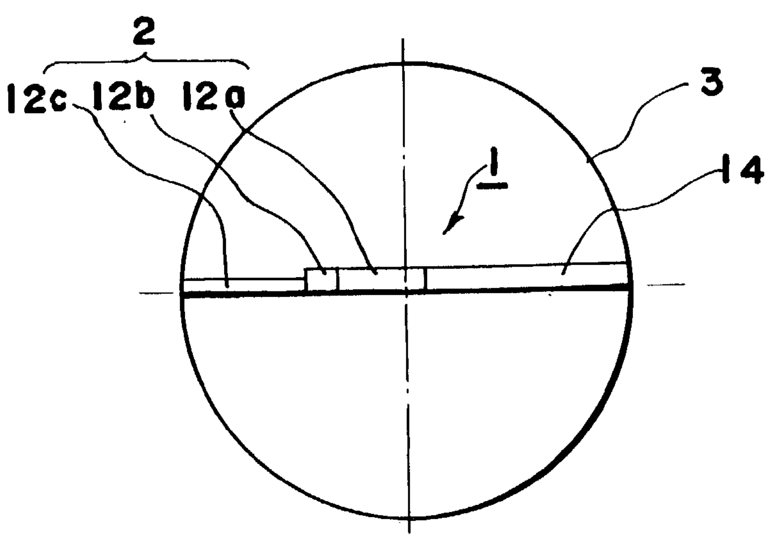
FIG. 5 is a plan explanatory view of a cutter for an optical fiber end surface processing according to another embodiment of the present invention.
Figure 6:
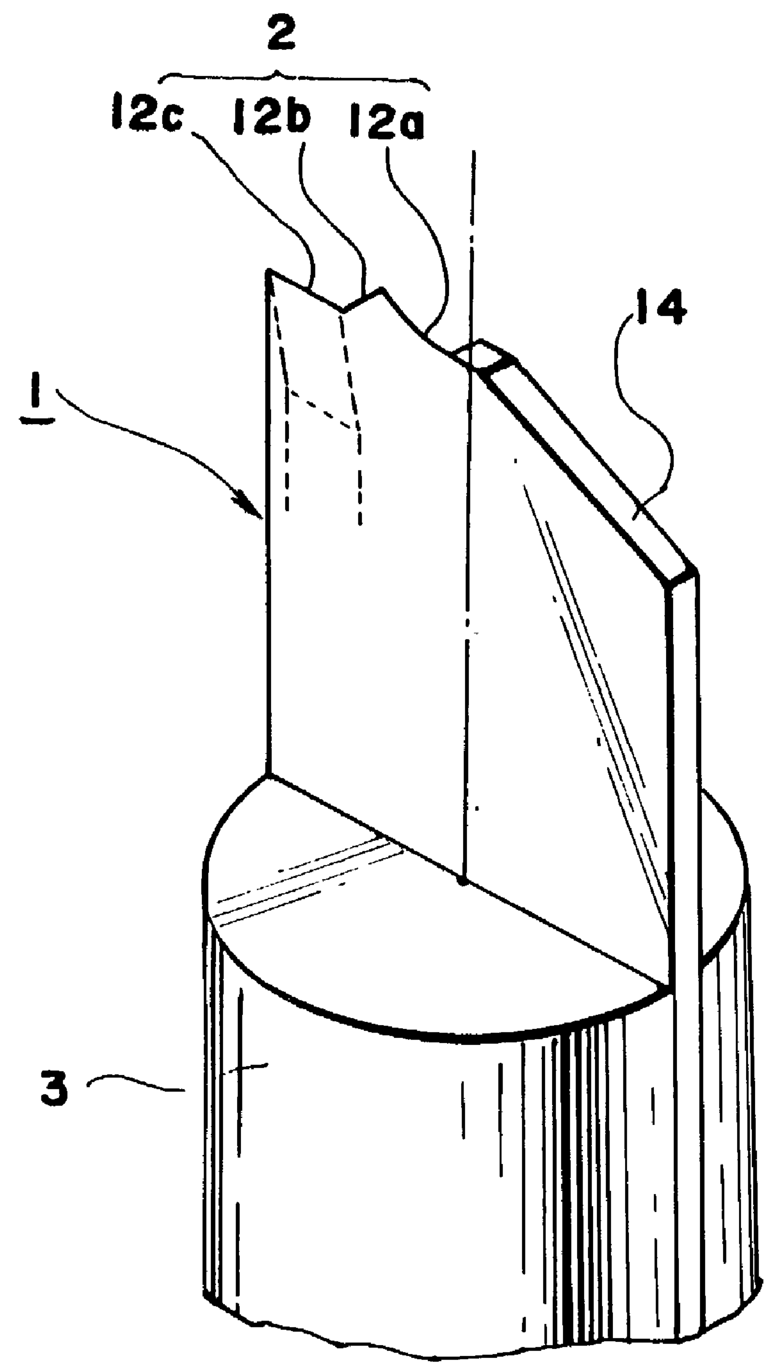
FIG. 6 is a perspective view of a cutter for an optical fiber end surface processing according to another embodiment of the present invention.
Figure 7:
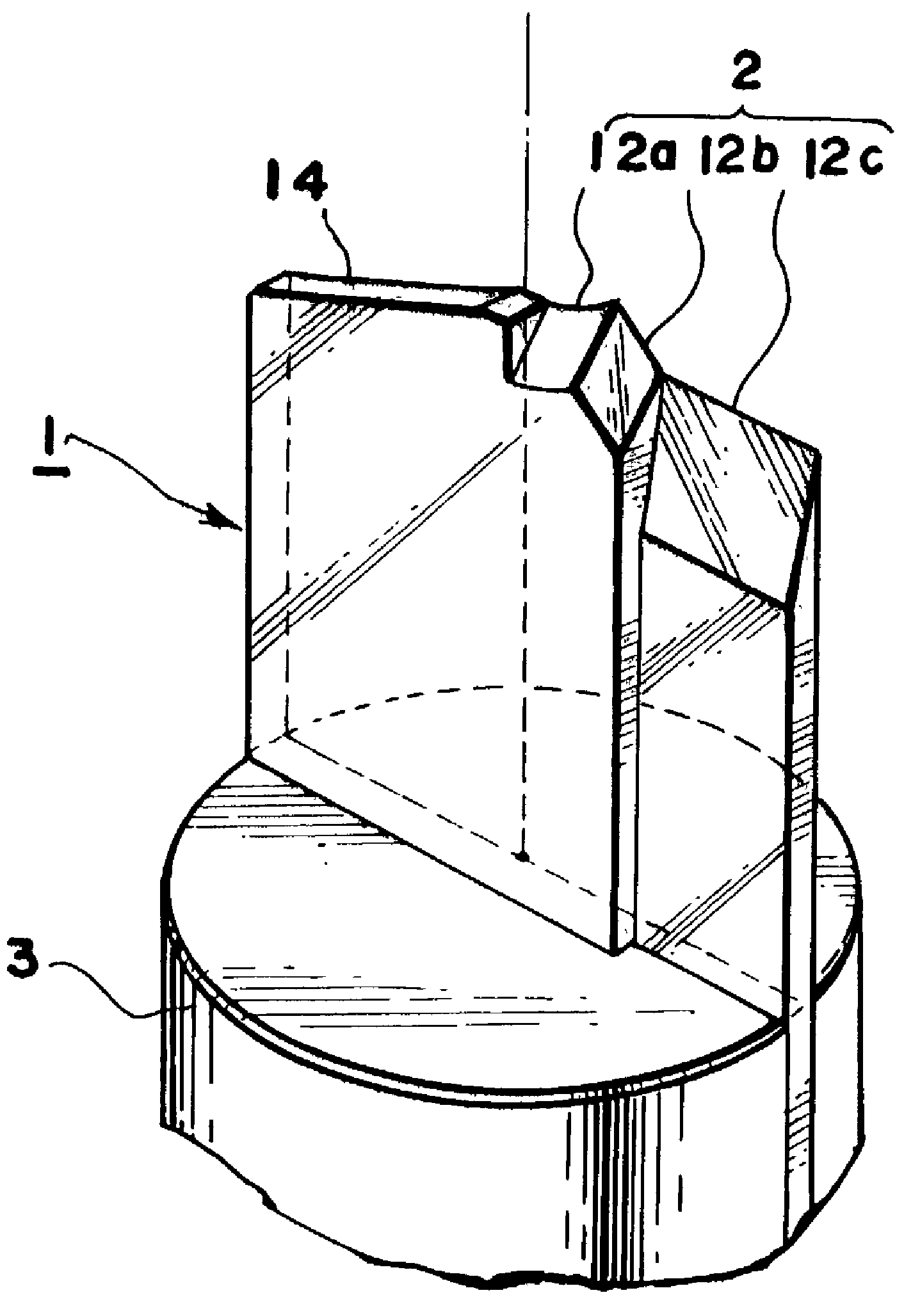
FIG. 7 is a perspective view as seen from the opposite direction of FIG. 6.

FIG. 4 is a front explanatory view of a cutter according to another embodiment of the present invention, FIG. 5 is a plan explanatory view of a cutter according to another embodiment of the present invention, FIG. 6 is a perspective view of a cutter according to another embodiment of the present invention, and FIG. 7 is a perspective view as seen from the opposite direction of FIG. 6.

The cutter 1 has a shaft portion 3 to be mounted to an optical fiber end surface processing apparatus described below (See FIGS. 6 and 7). The cutting edge 2 of the cutter 1 is only provided on one side with respect to the center thereof, and an inclined portion 14 having no cutting function is provided on the other side. This inclined portion 14 serves as a recess for preventing abutment against the optical fiber end surface when cutting the optical fiber end surface.

The cutting edge 2 of the cutter 1 has one side of the center a slightly curved recess 12*a*, which is connected to an inclined portion 12*b*, which is connected to a horizontal linear portion 12*c*. In this example, there is provided a minute flat portion 12*d* at the center. Further, in the cutting edge 2 of this cutter 1, the portion composed of the recess 12*a* and the inclined portion 12*b* (the range h1 in FIG. 4) and the portion consisting of the horizontal linear portion 12*c* (the range h2 in FIG. 4) have different cutting edge angles. In this example, the angle of the portion consisting of the horizontal linear portion 12*c* (the range h2) is more acute than that of the portion composed of the recess 12*a* and the inclined portion 12*b* (the range h1).

Figure 3:
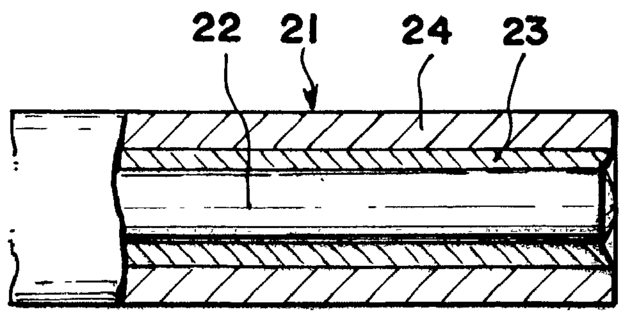
FIGS. 3A and 3B are enlarged sectional views showing examples of processed profile of plastic optical fiber end surfaces.
Figure 3:
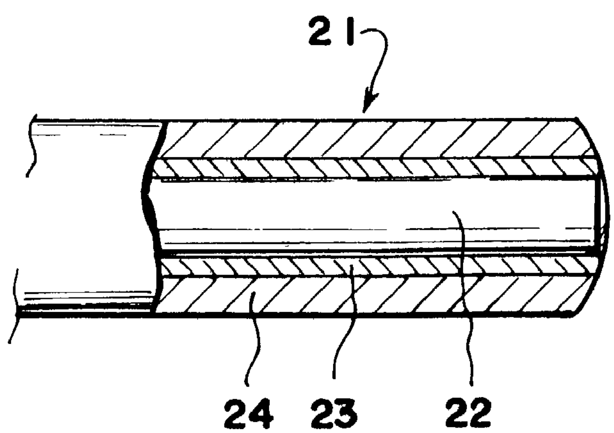

As shown in FIG. 3, the optical fiber 21 is generally composed of the core portion 22, the clad portion 23, and the jacket 24.

Thus, when the end surface of this optical fiber 21 is cut by rotating the cutter 1 of this embodiment, the end surface profile shown in FIG. 3A is obtained in correspondence with the shape of the cutter 1. That is, only the central core portion 22 is cut into a semi-spherical (lens-like) profile, and the clad portion 23 is cut into an inclined (tapered) surface, the jacket 24 being flat. Of course, the length of the recess 12*a* of the cutter 1 corresponds to the radius of the core portion 22, the width of the inclined portion 12*b* corresponds to the thickness of the clad portion 23, and the width of the horizontal linear portion 12*c* corresponds to the thickness of the jacket 24.

The cutting edge 2 of the cutter 1 is formed such that the portion consisting of the recess 12*a* and the inclined portion 12*b* (h1) and the portion consisting of the horizontal linear portion 12*c* (h2) have different cutting edge angles, so that if the materials of the core portion 22, the clad portion 23, and the jacket 24 are different, it is possible to perform cutting with the cutting edge 2 having cutting edge angles suitable for the respective materials, thus making it possible to perform cutting in a desirable fashion. Thus, if end surface processing is performed together with a connector attached to the terminal of the optical fiber 21, the cutting can be performed in a satisfactory manner.

Figure 8:
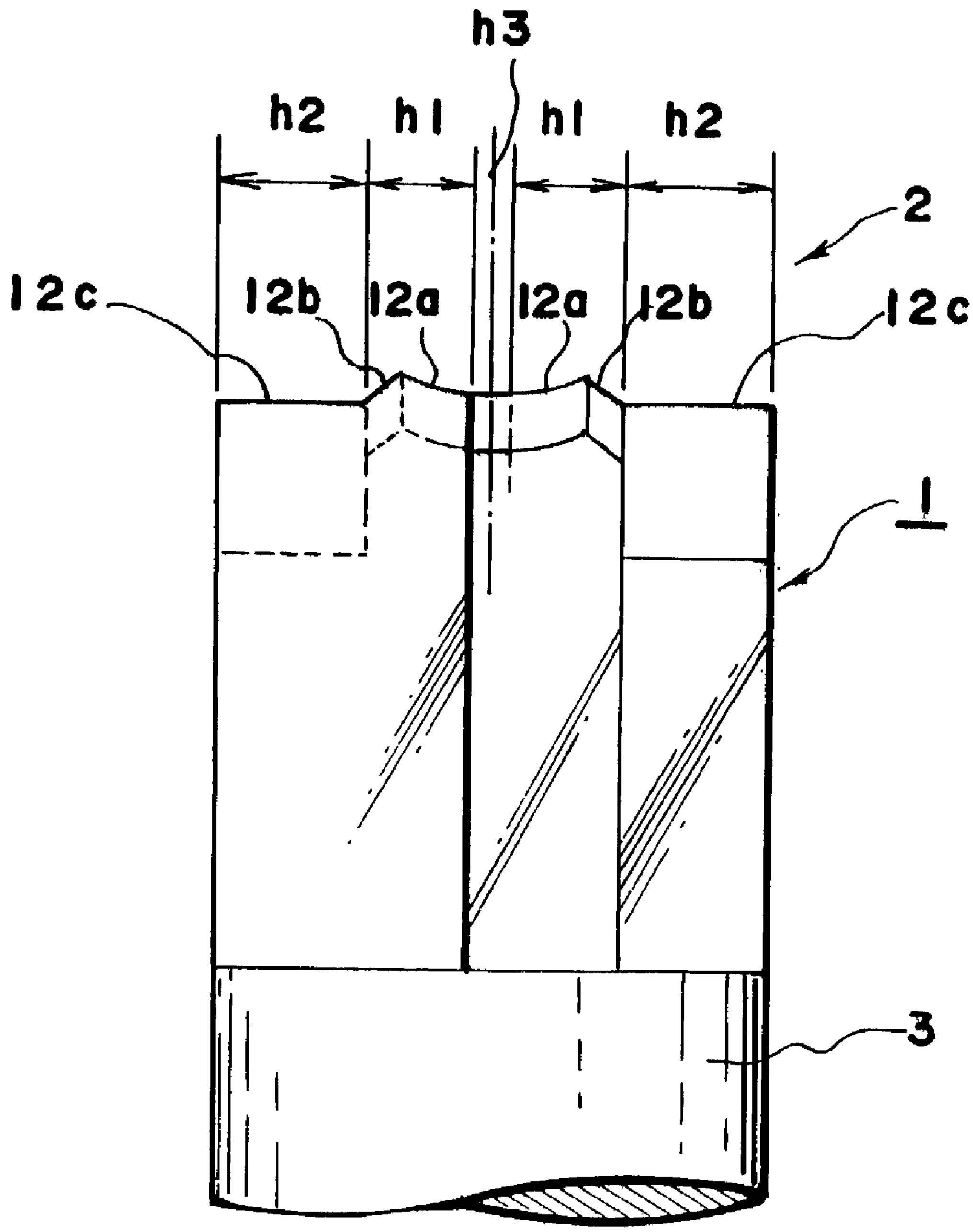
FIG. 8 is a front explanatory view of a cutter for an optical fiber end surface processing according to still another embodiment of the present invention.
Figure 9:
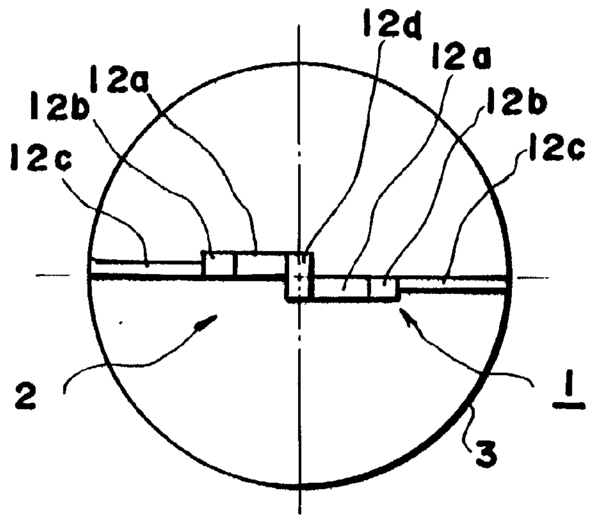
FIG. 9 is a plan explanatory view of a cutter for an optical fiber end surface processing according to still another embodiment of the present invention.
Figure 10:
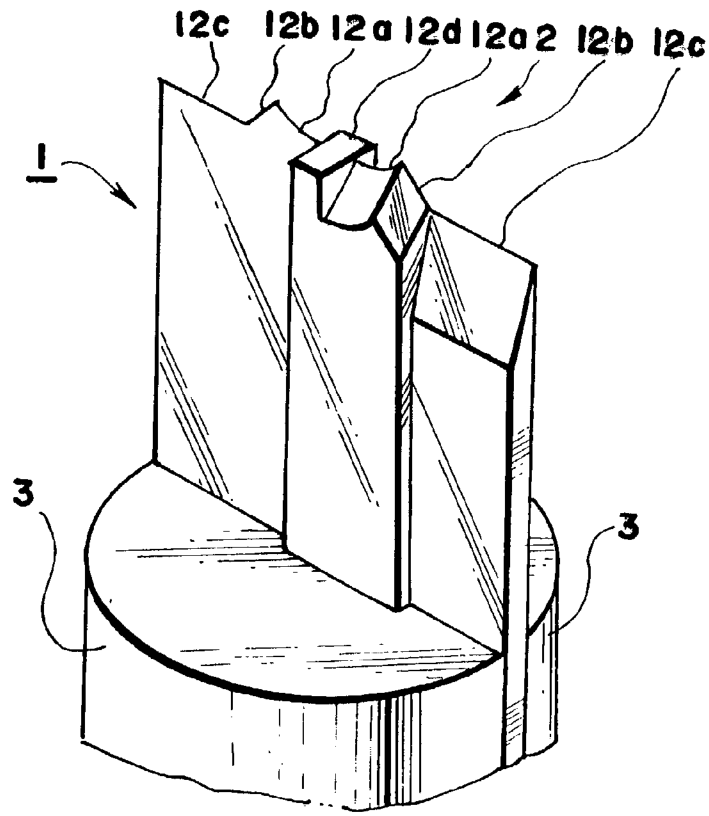
FIG. 10 is a perspective view of a cutter for an optical fiber end surface processing according to still another embodiment of the present invention.

FIGS. 8 through 10 show another embodiment of the cutter of the present invention. FIG. 8 is a front explanatory view of the cutter, FIG. 9 is a plan explanatory view thereof, and FIG. 10 is a perspective view thereof.

In this example, the total length of the cutter 1 (the length of the cutting edge) substantially corresponds to the diameter of the optical fiber. The shape of the cutting edge 2 is symmetrical with respect to the center, and the shape of the half with respect to the center is such that the cutting edge angle of the portion nearer to the center and that of the portion on the outer side are different. The shape of the half of the cutting edge 2 with respect to the center is the same as that of the above embodiment. Thus, the components which are the same as those of the above embodiment are indicated by the same reference numerals, and a detailed description thereof will be omitted.

The shape and the cutting edge angle of the cutter 1 are not restricted to those of the above embodiment. For example, when the cutting edge 2 of the cutter 1 has a concave semi-circular shape, the end surface profile of the optical fiber 21 is, as shown in FIG. 3B, such that the entire optical fiber end surface including not only the core portion 22 but also the clad portion 23 and the jacket 24 is a convex semi-spherical surface. When the cutter 1 has a convex semi-circular shape, the optical fiber end surface is of a concave semi-spherical profile. In either case, in correspondence with the construction of the optical fiber 21, the cutter 1 has different cutting edge angles for the different materials, whereby it is possible to perform an optimum cutting.

As described above, in the plastic optical fiber end surface processing method of the present invention, the end surface of an optical fiber is cut into a semi-spherical surface by the cutter 1. Actually, however, the optical fiber is thin and has flexibility, so that cutting is impossible solely by opposing the end surface of the optical fiber to the rotating cutter 1 and bringing them into contact with each other.

Figure 11:
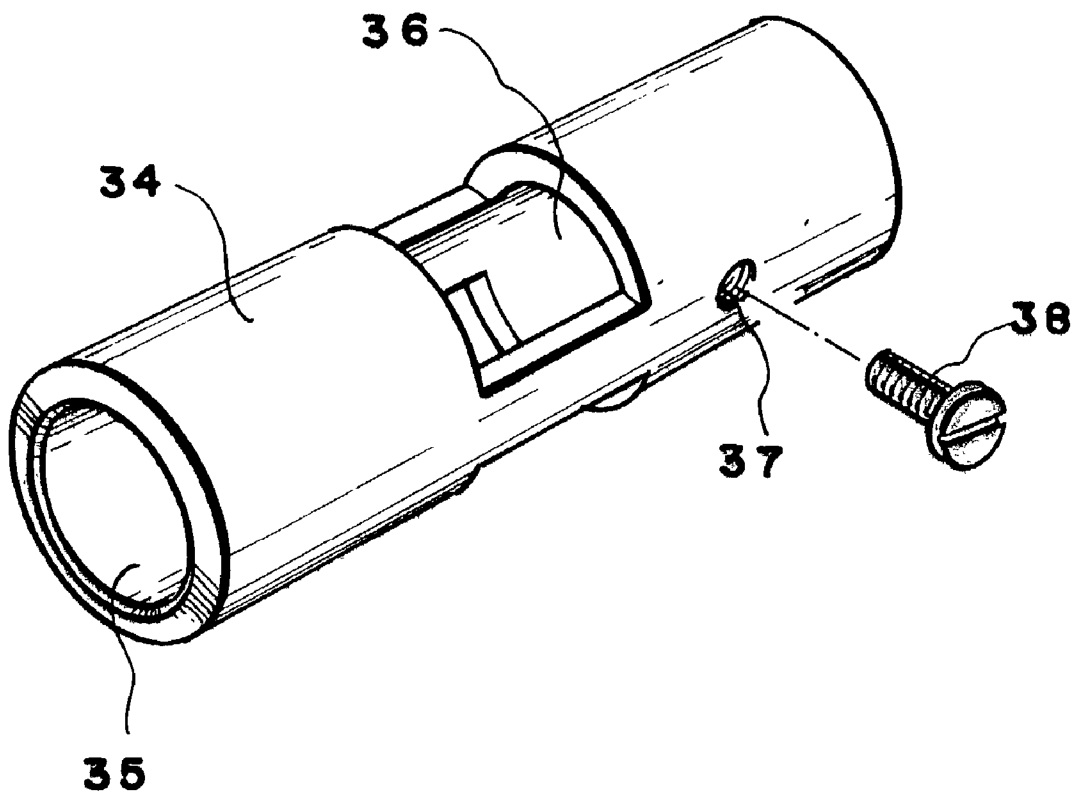
FIG. 11 is an enlarged perspective view of a holder.
Figure 12:
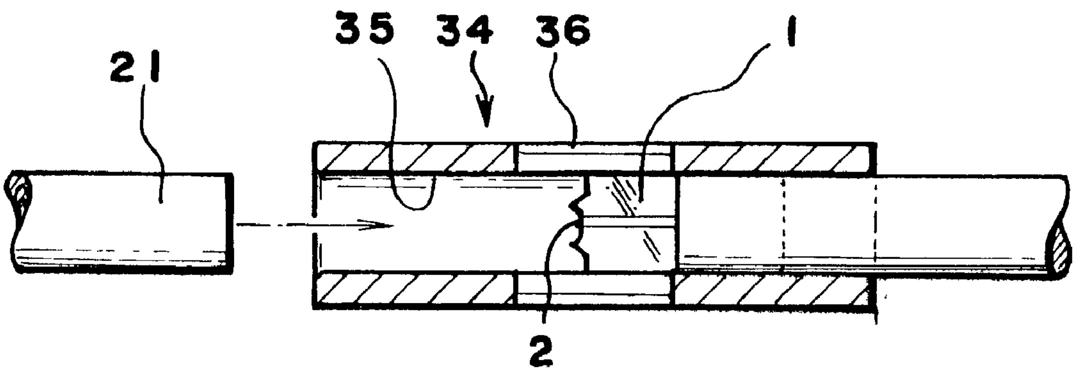
FIGS. 12A and 12B are enlarged sectional views showing how the holder is used.
Figure 12:
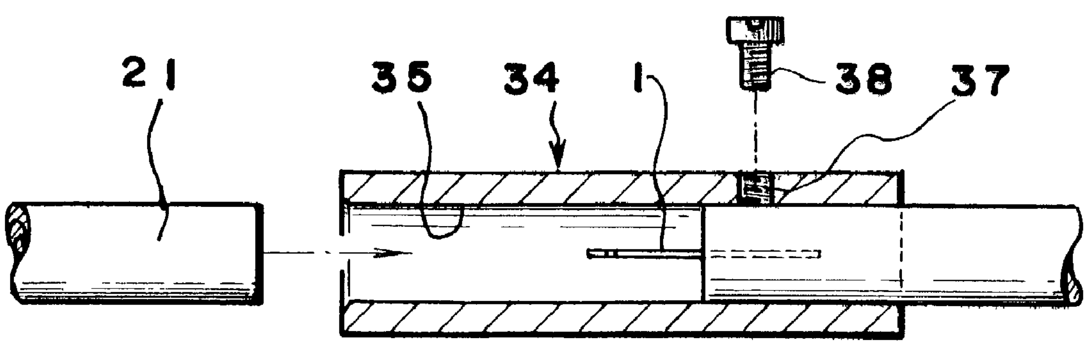

In practice, the cutting operation is performed by using a holder 34 as shown in FIG. 11. The holder 34 is formed as a shaft-like member having a through-hole 35, a window 36 in a middle portion of the shaft-like member, and a screw hole 37. As shown in FIGS. 12A and 12B, the cutter 1 is inserted from one side into the through-hole 35 of the holder 34 up to the position of the window 36 and rotated, and the optical fiber 21 is inserted from the other side and its end surface is brought into contact with the rotating cutter 1, whereby the cutting operation is performed in the through-hole 35 of the holder 34. In this process, the chips are discharged through the window 36. By thus performing cutting inside the through-hole 35 of the holder 34, no positional deviation of the optical fiber 21 is involved, and the axis of the optical fiber 21 is in alignment with the axis of the cutter 1, whereby the formation of a semi-spherical surface is effected in a satisfactory manner.

Figure 13:
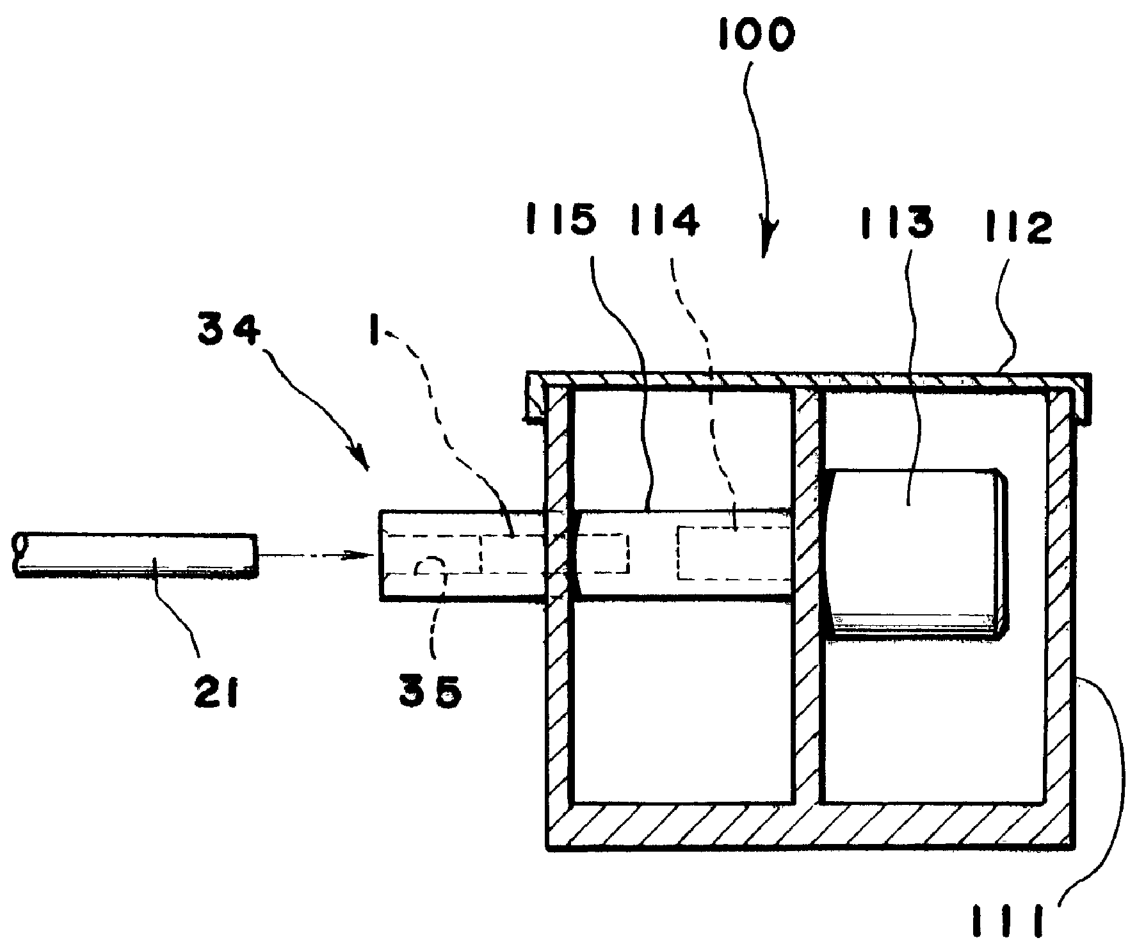
FIG. 13 is a sectional explanatory view of an optical fiber end surface processing apparatus according to an embodiment of the present invention.

More specifically, a plastic optical fiber end surface processing apparatus 100 as shown in FIG. 13 is used. This plastic optical fiber end surface processing apparatus 100 has a casing 111 in which a motor 113 is provided, the cutter 1 being connected to the driving shaft 114 of the motor 113 through the intermediation of a coupling 115. As shown in FIG. 12B, the cutter 1 is fitted into the through-hole 35 of the holder 34 and secured by a screw 38. Thus, the cutter 1 can be rotated by the motor 113; as stated above, the optical fiber 21 is inserted from the other side into the through-hole 35 of the 34 and brought into contact with the rotating cutter 1, whereby end surface processing can be performed. In FIG. 13, numeral 112 indicates the cover of the casing 111.

By thus cutting the end surface of the optical fiber 21 in the through-hole 35 of the holder 34, there is no positional deviation of the optical fiber 21, and the axis of the optical fiber 21 is in alignment with the axis of the cutter 1, whereby the end surface processing can be effected in a satisfactory manner.

In the cutter 1 of the present invention, the central portion and the outer portion of the cutting edge 2 exhibit different angles, so that the core portion 22, the clad portion 22, the jacket 24, etc. constituting the optical fiber 21 can be cut at appropriate cutting edge angles, whereby the cutting of the end surface can be effected with the accuracy in a desirable manner.

The above description has been made for the case of the single-core optical fiber. In the case of a multiple optical fiber, an end surface processing apparatus for multiple optical fibers is used.

Figure 14:
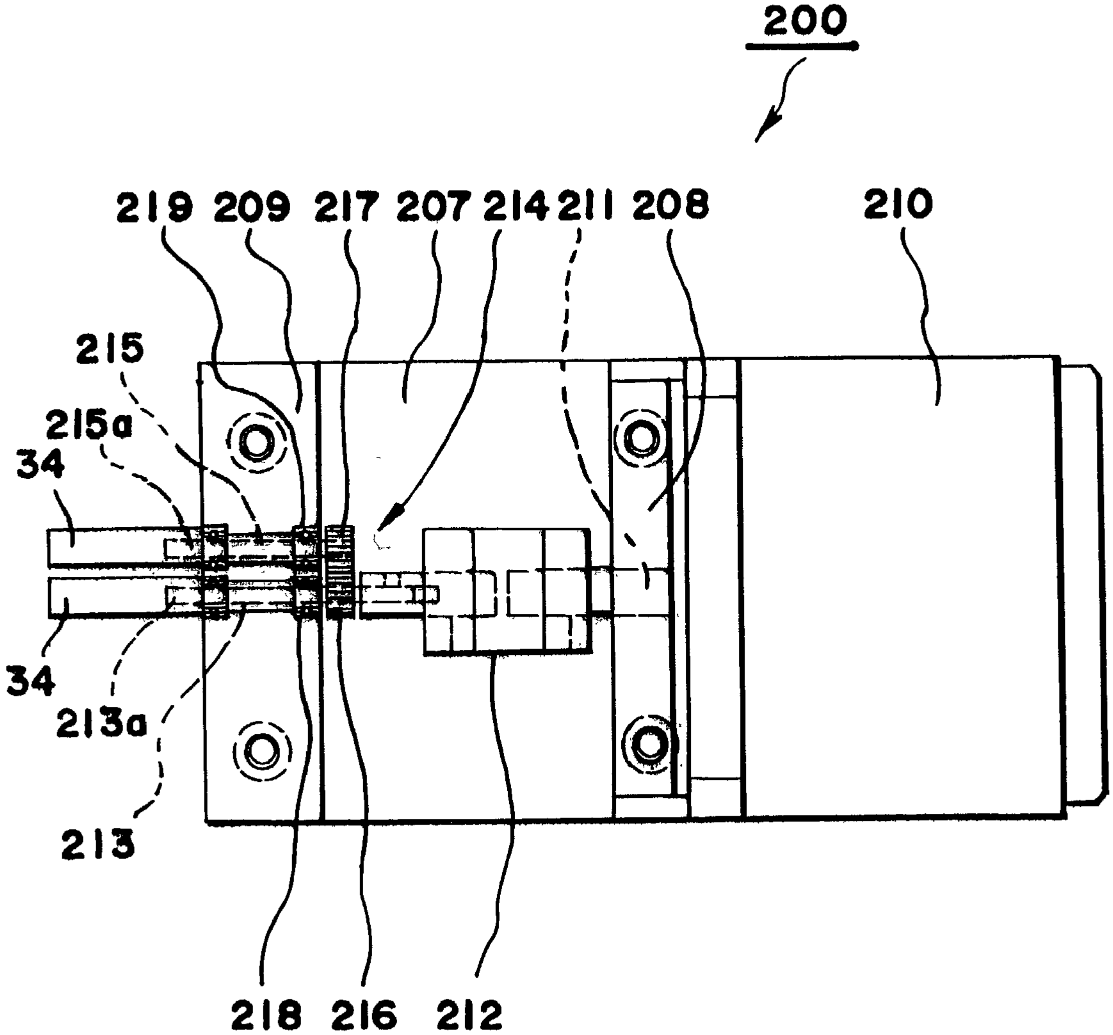
FIG. 14 is a plan explanatory view of a multiple plastic optical fiber end surface processing apparatus according to an embodiment of the present invention.
Figure 15:
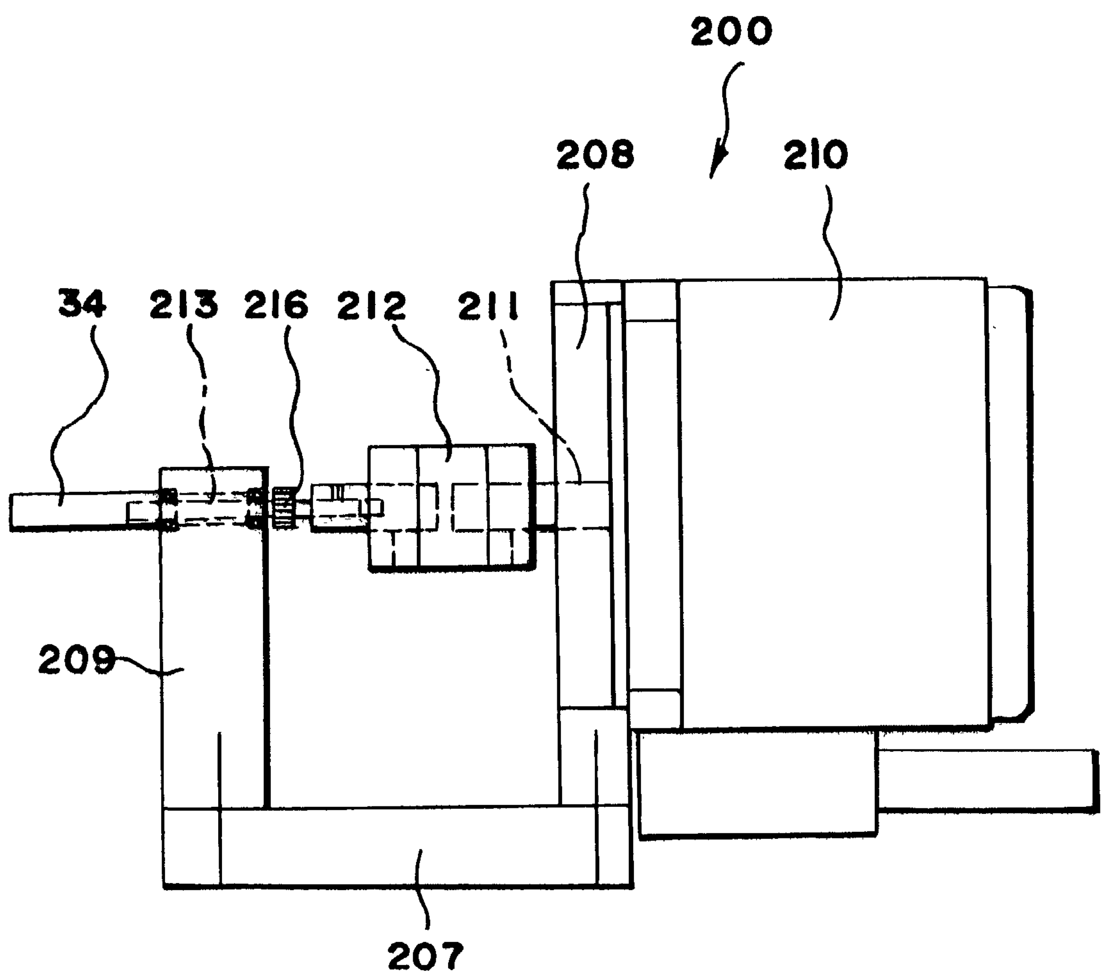
FIG. 15 is a front explanatory view of a multiple plastic optical fiber end surface processing apparatus according to an embodiment of the present invention.
Figure 16:
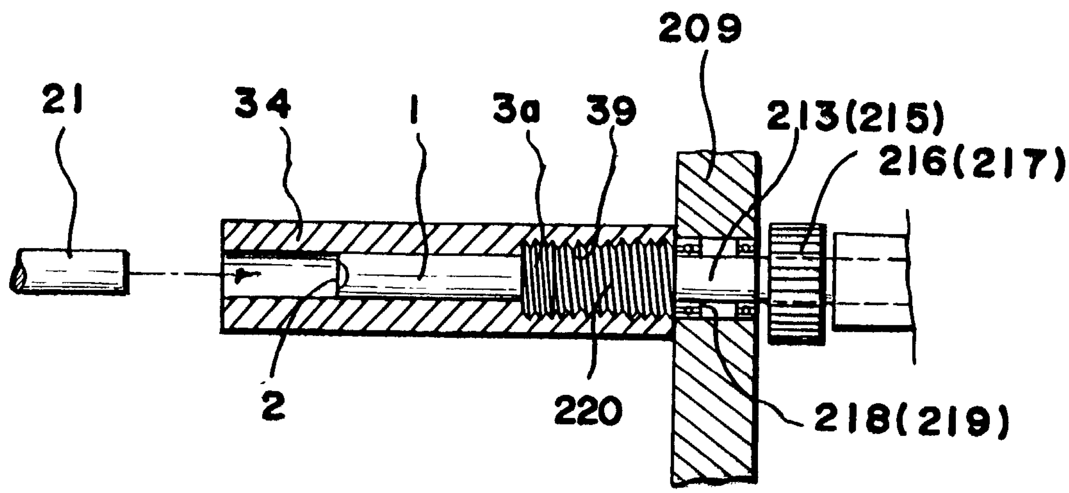
FIG. 16 is an enlarged main portion sectional explanatory view of a multiple plastic optical fiber end surface processing apparatus according to an embodiment of the present invention.
Figure 18:
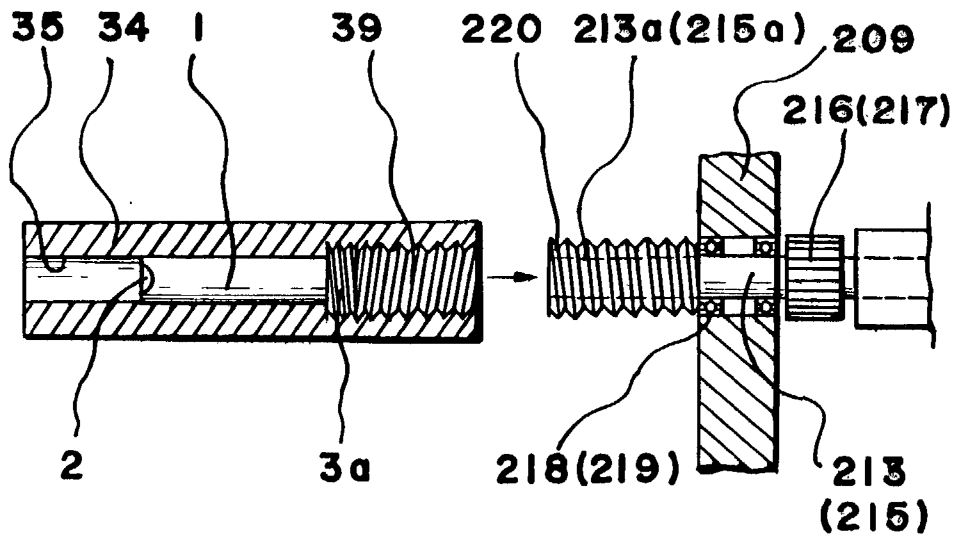
FIG. 18 is a sectional explanatory view showing how a holder is mounted to a rotation shaft.
Figure 17:
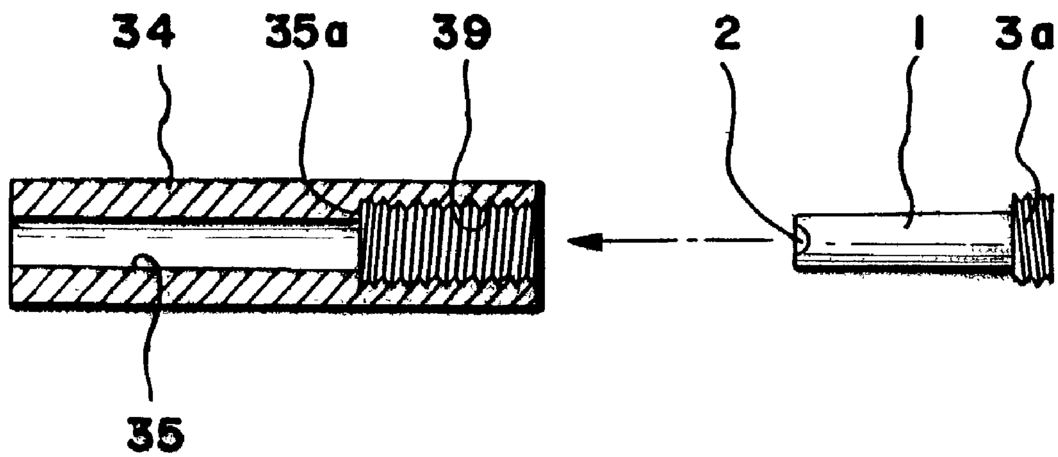
FIG. 17 is a sectional explanatory view showing how a cutter is mounted to a holder.

FIGS. 14 through 19 show an embodiment of a multiple plastic optical fiber end surface processing apparatus. FIG. 14 is a plan explanatory view of the same, FIG. 15 is a front explanatory view of the same, FIG. 16 is an enlarged partial sectional explanatory view of a main portion thereof, FIG. 17 is a sectional explanatory view showing how a cutter is mounted to a holder, and FIG. 18 is a sectional explanatory view showing how the holder is mounted to a rotation shaft.

In the drawings, a multiple plastic optical fiber end surface processing apparatus 200 includes a first rotation shaft 213 adapted to rotate in a condition in which it is connected to a connection member, such as a coupling 212, connected to a driving shaft 211 of a motor 210, and a second rotation shaft 215 arranged parallel to the first rotation shaft 213 and adapted to rotate in a condition in which it is connected to the motor 210 or the first rotation shaft 213 through the intermediation of a transmission mechanism 214. Detachably mounted to the first and second rotation shafts 213 and 215 in parallel are holders 34 each having a through-hole 35 to which a cutter 1 is detachably mounted, an optical fiber being inserted into the through-hole 35 so that its end surface may be cut by the cutter 1.

A mounting plate 208 and a bearing plate 209 are provided on a base 207 so as to be spaced apart from each other by a predetermined distance, the motor 210 being secured to the mounting plate 208. The driving shaft 211 of the motor 210 extends through the mounting plate 208 and protrudes on the bearing plate 209 side, and the coupling 212 serving as the connection member is provided on the protruding portion of the driving shaft 211.

The first rotation shaft 213 is rotatably supported by a bearing 218 of the bearing plate 209 and extends through the bearing plate 209, one end thereof being connected to the coupling 212 and the other end thereof to the holder 34.

The second rotation shaft 215 is rotatably supported by a bearing 219 of the bearing plate 209 and extends through the bearing plate 209, one end thereof being fastened to a gear 217 and the other end thereof being mounted to the holder 34. The second rotation shaft 215 and the first rotation shaft 213 are arranged parallel to each other. The gear 217 of the second rotation shaft 215 is in mesh with a gear 216 fastened to the first rotation shaft 213. Thus, when the motor 210 is driven, the first rotation shaft 213 rotates and, further, the second rotation shaft 215 also rotates through the transmission mechanism 214 consisting of the gears 216 and 217. Of course, the transmission mechanism 214 may consist of some other means, such as a belt.

As shown in FIGS. 16 through 18, the holder 34 is formed as a shaft-like member (short cylinder) having a through-hole 35. One end portion of the through-hole 35 is formed as a threaded hole 39 having a relatively large diameter. The shape of the cutting edge of the cutter 1 is as described above. The base end of the cutter 1 of this example, which is on the opposite side of the cutting edge 2, is formed as a screw portion **3*a* having a relatively large diameter. As shown in FIG. 18, the cutter 1 is concentrically inserted into the through-hole 35 of the holder 34, and, as shown in FIG. 16, mounted by threadedly engaging the screw portion 3*a* with the threaded portion 39 of the holder 34. This engagement process is effected until the screw portion 3*a* with a relatively large diameter is locked by a step portion 35*a* of the through-hole 35 of the holder 34**.

A screw 220 is provided on each of the protruding portions **213*a* and 215*a* of the first and second rotation shafts 213 and 215, and the holders 34 to which the cutters 1 are mounted are mounted to the first and second rotation shafts 213 and 215 by threadedly engaging the screws 220 with the threaded holes 39**.

Figure 19:
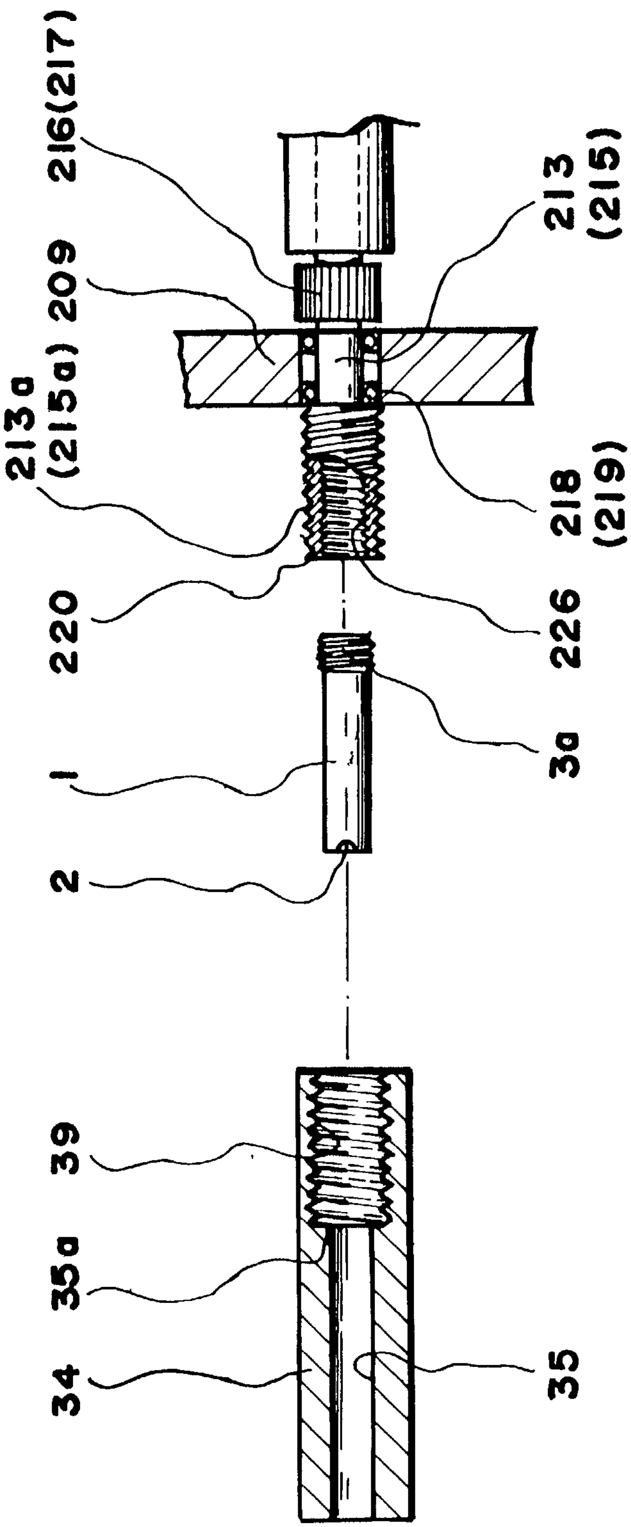
FIG. 19 is a sectional explanatory view showing how a cutter is mounted to a rotation shaft.

As shown in FIG. 19, it is also possible for the cutters 1 to be mounted by screwing the screw portions **3*a* of the cutters 1 into threaded holes 226 provided at the forward ends of the first and second rotation shafts 213 and 215**.

The multiple plastic optical fiber end surface processing apparatus of the above embodiment operates as follows.

The first rotation shaft 213, which is connected to the coupling 212 connected to the driving shaft 211 of the motor 210, is rotated by driving the motor 210. Since the gear 216 of the first rotation shaft 213 and the gear 217 of the second rotation shaft 215 are in mesh with each other, the rotation of the first rotation shaft 213 causes the second rotation shaft 215 to rotate. The holders 34 to which the cutters 1 are attached are mounted to the first and second rotation shafts 213 and 215 through screwing engagement, the holders 34 rotates with the first and second rotation shafts 213 and 215, which means the cutters 1 also rotate.

Thus, when the optical fibers 21 are inserted from the forward end side into the through-holes 35 of the holders 34, as indicated by the arrow in FIG. 16, and their end surfaces are abutted against the rotating cutters 1 with a small force, the end surfaces of the optical fibers 21 are cut into a predetermined profile by the cutters 1. Since the holders 34 are provided in parallel, the individual optical fibers of a multiple plastic optical fiber can be simultaneously cut by the respective cutters of the holders 34.

Thus, it is desirable for the number of holders 34 provided in parallel to be in correspondence with the number of optical fibers of the multiple plastic optical fibers to be processed. Further, it is also desirable for the interval between the holders 34 to be close to the interval between the optical fibers of the multiple plastic optical fiber.

By thus performing cutting in the through-holes 35 of the holders 34, there is no positional deviation of the optical fibers 21, and the axes of the optical fibers 21 are in alignment with the axes of the cutters 1, making it possible to perform end surface processing in a desirable manner.

In the case in which chips (swarf) generated during the cutting of the optical fiber end surfaces affect the accuracy in cutting, it is possible to provide windows (holes) 36 as shown in FIGS. 11 and 12A in the holders 34 at positions in the vicinity of the cutting edges 2 of the cutters 1 and discharge the chips therethrough.

Next, embodiments of the optical fiber connection method of the present invention will be described in detail with reference to the drawings.

Figure 20:
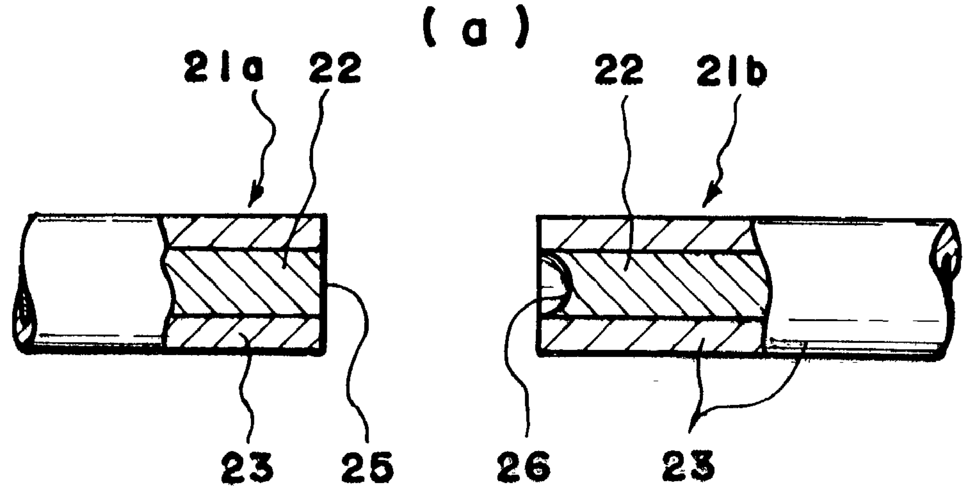
Figure 20:
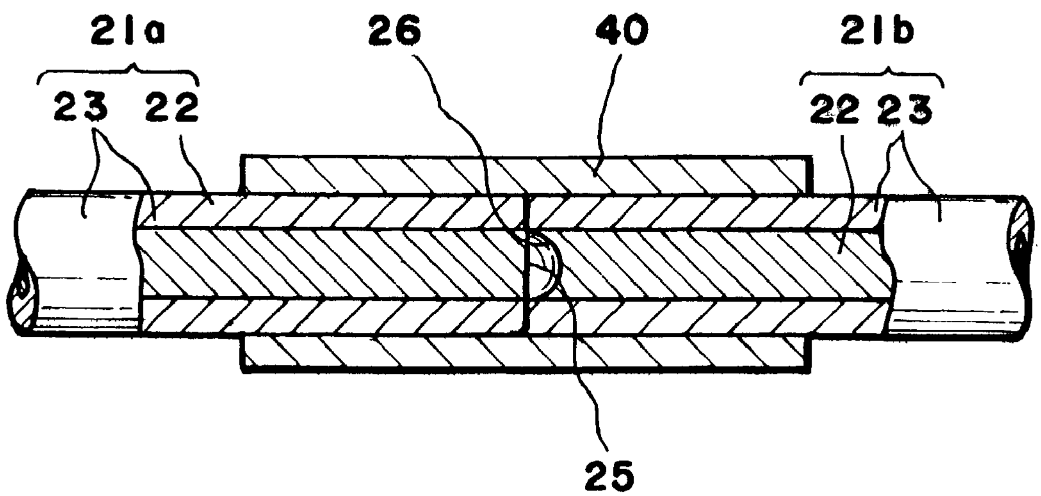

FIGS. 20A and 20B are enlarged sectional explanatory views illustrating a first embodiment of the optical fiber connection method of the present invention. Each of optical fibers **21*a* and 21*b* is formed of a core portion 22 and a clad portion 23. In this embodiment, the connection end surface of one optical fiber 21*a* is formed as a flat surface 25, whereas the connection end surface of the other optical fiber 21*b* is formed as a concave semi-spherical surface 26. The connection end surfaces 25 and 26 thus formed face each other for abutment connection. In this process, it is desirable for the optical fibers 21*a* and 21*b*** to be connected coaxially.

FIG. 20B shows an example of how the optical fibers 21*a* and 21*b* are connected. In this example, a sleeve 40 for connection is used. One optical fiber 21*a* is inserted into one opening of this sleeve 40, and the other optical fiber 21*b* is inserted into the other opening thereof, the connection end surfaces being connected through abutment connection in the sleeve 40. Due to this arrangement, coaxial connection of the two optical fibers 21*a* and 21*b* is facilitated.

Figure 21:
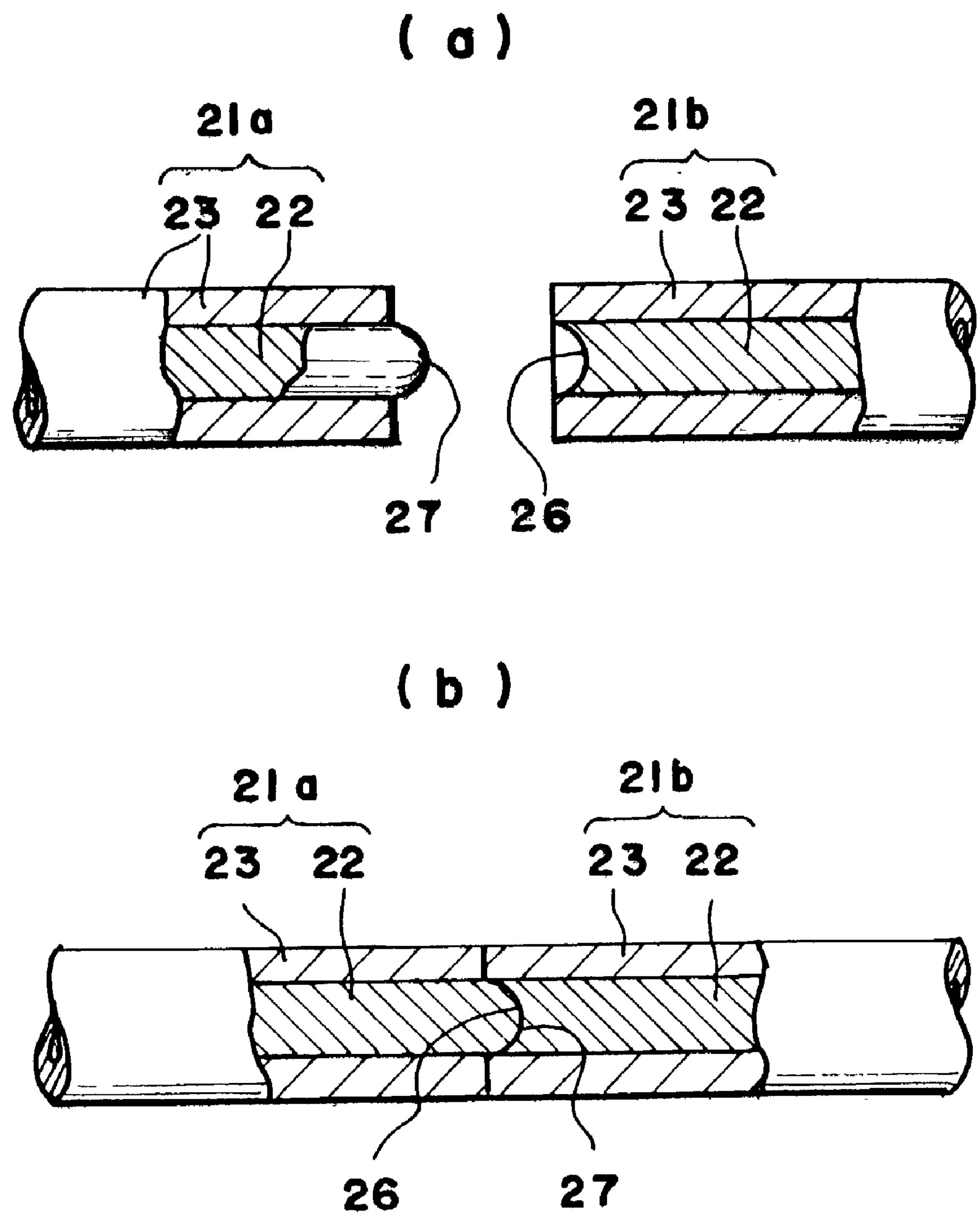

FIGS. 21A and 21B are enlarged sectional explanatory views illustrating a second embodiment of the optical fiber connection method of the present invention. In this embodiment, the connection end surface of one optical fiber 21*a* is formed as a convex semi-spherical surface 27, and the connection end surface of the other optical fiber 21*b* is formed as a concave semi-spherical surface 26. Otherwise, this embodiment is the same as the above-described embodiment. Thus, the components which are the same those of the above embodiment are indicated by the same reference numerals, and a detailed description of such components will be omitted.

The connection end surfaces thus formed are coaxially abutment-connected as shown in FIG. 21B.

Figure 22:
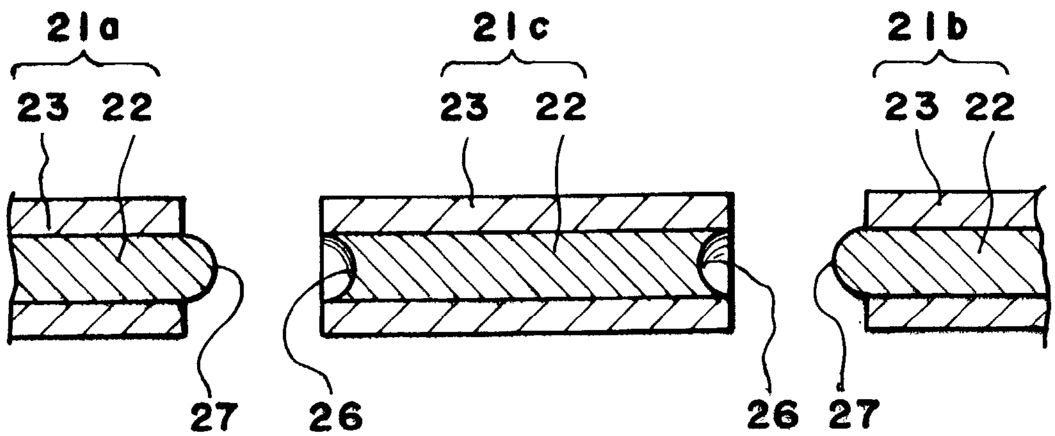
Figure 22:
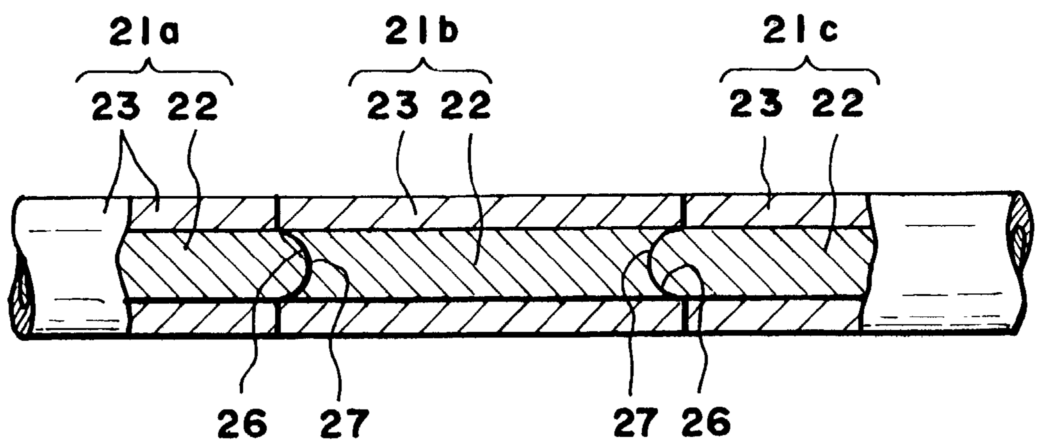

FIGS. 22A and 22B are enlarged sectional explanatory views illustrating a third embodiment of the present invention. In this embodiment, connection is effected with an intermediate connection optical fiber 21*c* being provided in-between. The connection end surface of one optical fiber 21*a* is formed as a convex semi-spherical surface 27; the connection end surface of the other optical fiber 21*b* is formed as a convex semi-spherical surface 27; and both connection end surfaces of the connection optical fiber 21*c* are formed as concave semi-spherical surfaces 26. Otherwise, this embodiment is the same as the above-described embodiment. Thus, the components which are the same those of the above embodiment are indicated by the same reference numerals and a detailed description of such components will be omitted.

As shown in FIG. 22B, in this construction, the connection end surface of one optical fiber 21*a* is abutment-connected to one end surface of the connection optical fiber 21*c*, and the connection end surface of the other optical fiber 21*b* is abutment-connected to the other end surface of the connection optical fiber 21*c*.

Figure 23:
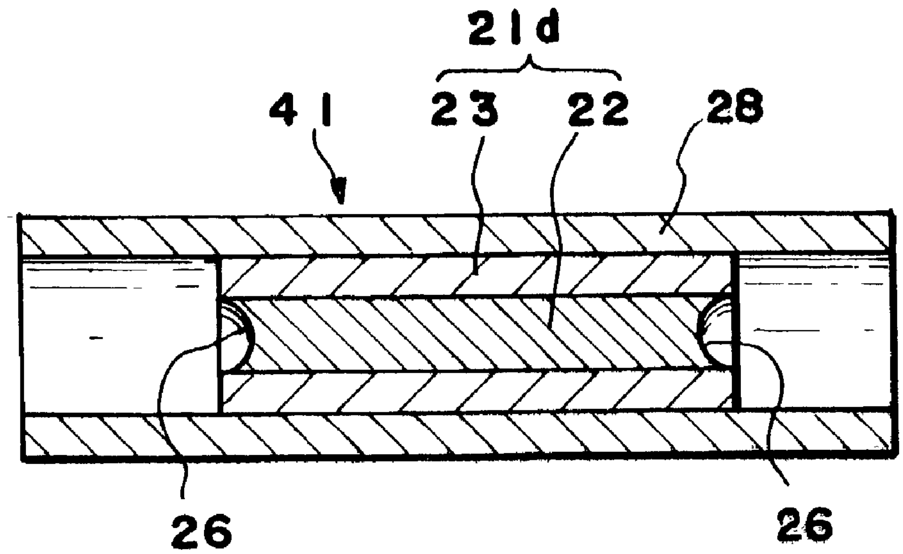
Figure 23:
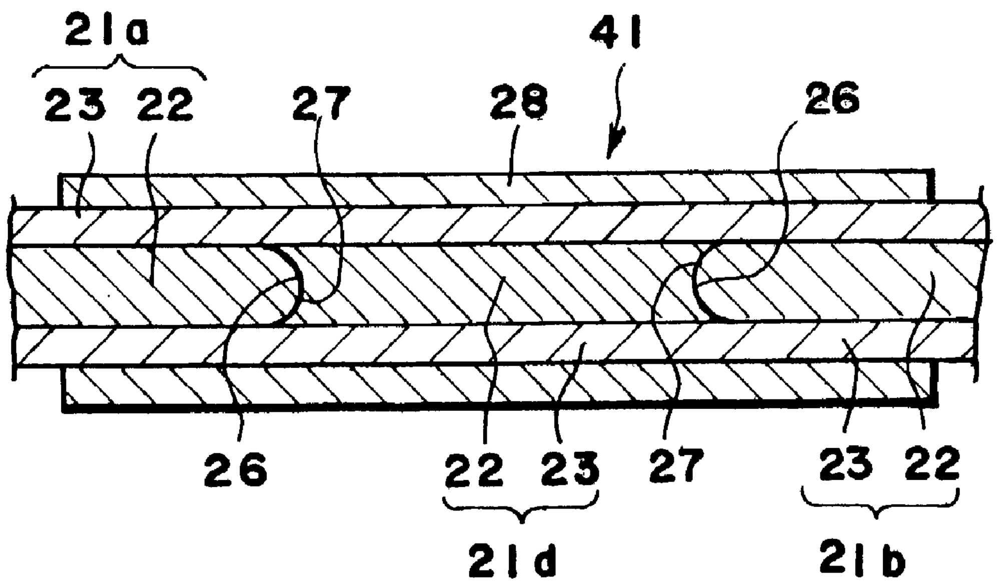

FIGS. 23A and 23B are enlarged sectional explanatory views illustrating a fourth embodiment of the optical fiber connection method of the present invention. In this embodiment, connection is effected by using a connection unit 41. The connection unit 41 includes a cylindrical holder 28, which contains an optical fiber piece 21*d* whose end surfaces are formed as concave semi-spherical surfaces 26. As shown in FIG. 23B, in this connection unit 41, one optical fiber 21*a* whose connection end surface is formed as a convex semi-spherical surface 27 is inserted into one opening of the holder 28 and abutted against one end surface of the optical fiber piece 21*d*, and the other optical fiber 21*b* whose connection end surface is formed as a convex semi-spherical surface 27 is inserted into the other opening of the holder 28 and abutted against the other end surface of the optical fiber piece 21*d*. Using this connection unit 41 facilitates the connection and axis alignment. The components which are the same as those of the above-described embodiment are indicated by the same reference numerals.

Figure 24:
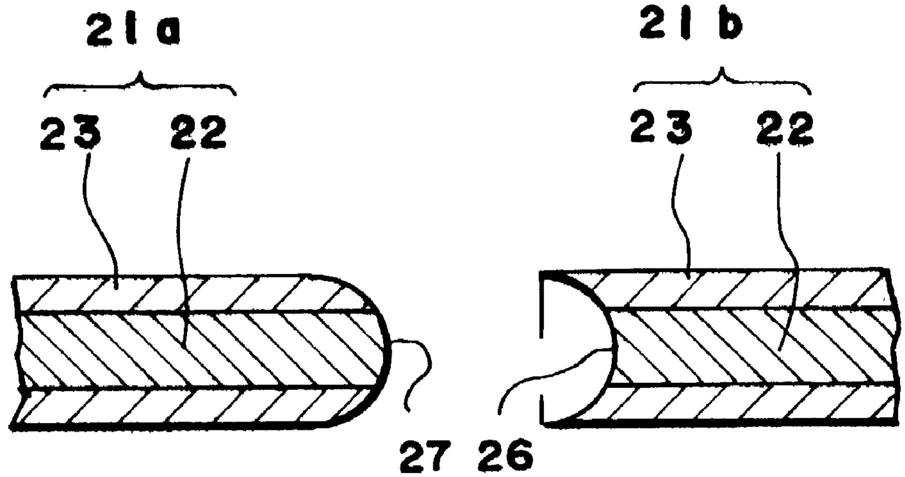
FIG. 24 is an enlarged sectional explanatory view illustrating a fifth embodiment of the optical fiber connection method of the present invention.

FIG. 24 is an enlarged sectional explanatory view illustrating a fifth embodiment of the optical fiber connection method of the present invention. In this embodiment, not only the core portions 22 but also the clad portions 23 of the connection end surfaces of the optical fibers 21*a* and 21*b* are formed as semi-spherical surfaces. In this example, the connection end surface of the optical fiber 21*a* is formed as a convex semi-spherical surface 27, and the connection end surface of the optical fiber 21*b* is formed as a concave semi-spherical surface 26, the two optical fibers 21*a* and 21*b* being connected together by abutting their connection end surfaces against each other. Otherwise, this embodiment is the same as the above-described embodiment. Thus, the components which are the same those of the above embodiment are indicated by the same reference numerals and a detailed description of such components will be omitted.

Figure 25:
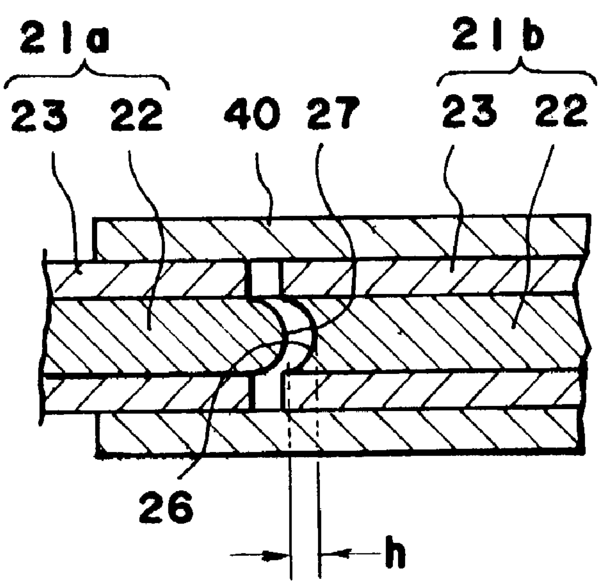
FIG. 25 is an enlarged sectional explanatory view showing how connection is effected by an optical fiber connection method of the present invention.

By thus forming the connection end surfaces of the optical fibers as semi-spherical surfaces, it is possible to condense or diffuse the incident light and outgoing light, so that it is possible to prevent a reduction in light quantity at the optical fiber connection portion. Further, even if, as shown in FIG. 25, a gap h is generated between the connection end surfaces of the optical fibers 21*a* and 21*b* to be connected, it is possible to mitigate the reduction in light quantity. In FIG. 25, the components which are the same those of the above embodiment are indicated by the same reference numerals, and a detailed description of such components will be omitted.

Figure 26:
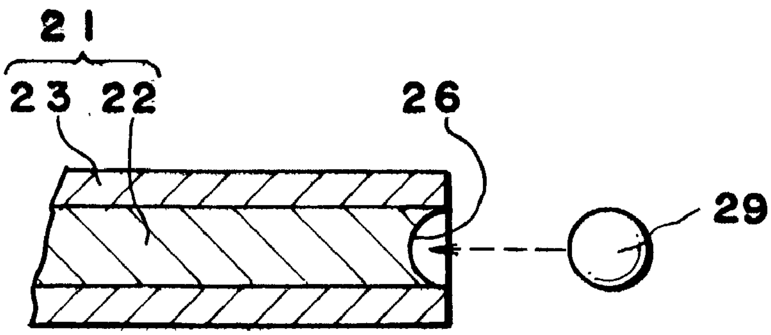
Figure 26:
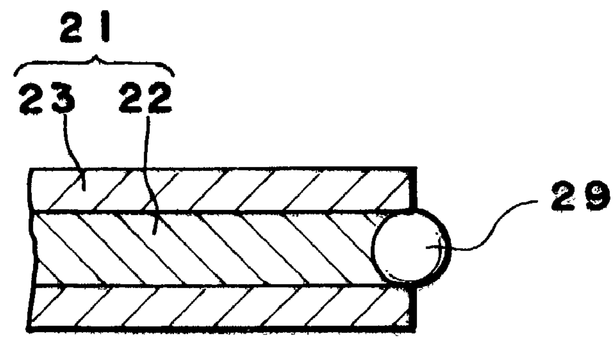

FIGS. 26A and 26B are enlarged sectional explanatory views illustrating a sixth embodiment of the optical fiber connection method of the present invention, showing the method in the order of formation steps. In this embodiment, a material 29 of a different refractive index is provided at the connection end surface of the optical fiber 21. In this example, the connection end surface of the optical fiber 21 is formed as a concave semi-spherical surface 26, and a spherical material 29 of a different refractive index is provided at this concave semi-spherical surface 26. In forming this connection end surface, the end surface of the optical fiber 21 is first formed as a concave semi-spherical surface 26 as shown in FIG. 26A, and then the spherical material 29 of a different refractive index is attached as shown in FIG. 26B. As the attaching means, well-known means, such as adhesion or fusion, is adopted.

Figure 27:
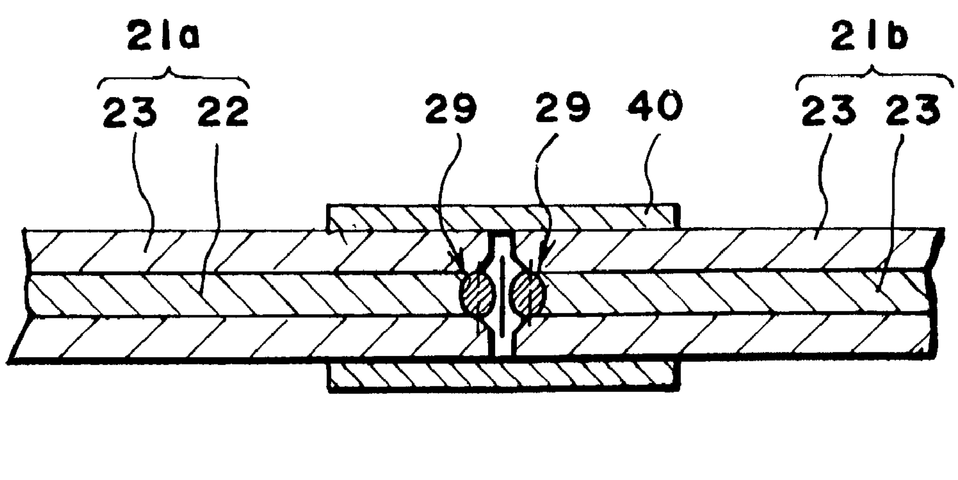
FIG. 27 is an enlarged sectional explanatory view showing a connection example of the sixth embodiment of the optical fiber connection method of the present invention.
Figure 28:
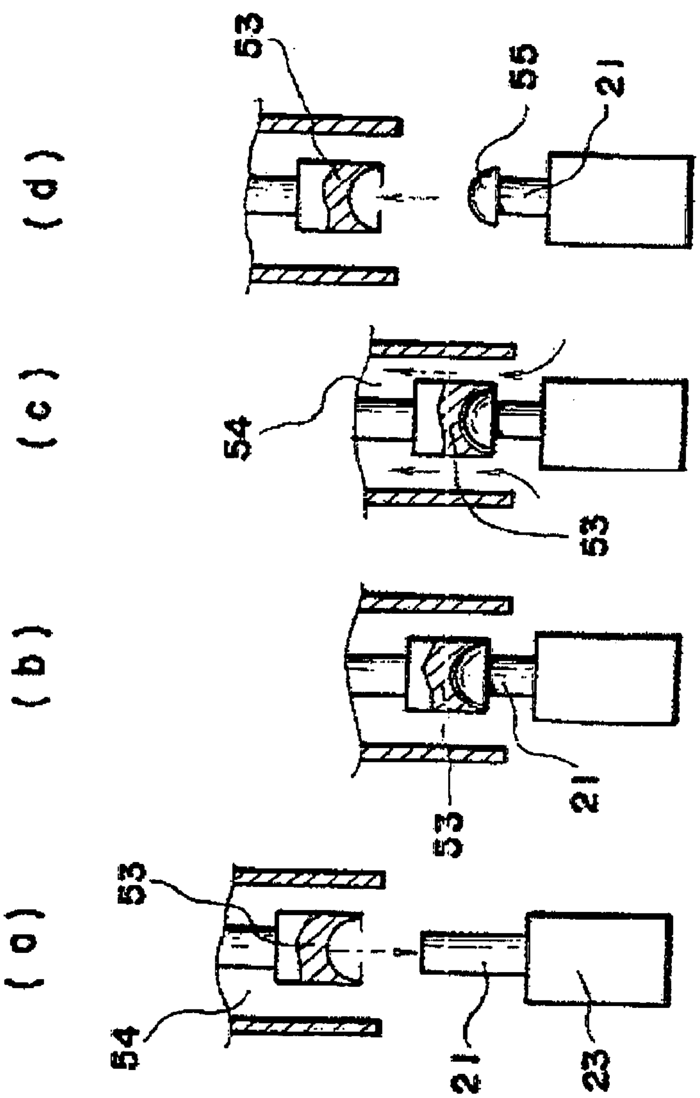
FIGS. 28A, 28B, 28C and 28D are sectional explanatory views showing the processes of a conventional method.

FIG. 27 is an enlarged sectional explanatory view illustrating an embodiment in which optical fibers 21*a* and 21*b* to the connection end surface of each of which a spherical material 29 of a different refractive index is attached are connected to each other. In this example, the connection end surfaces of the optical fibers 21*a* and 21*b* are abutment-connected in a sleeve 40. Due to this arrangement, it is possible to change refractive index at the end surface, so that the incident light and the outgoing light can be refracted in a predetermined direction.

Further, it is also possible to attach the material of a different refractive index only to one of the optical fibers, and the shape of the material of a different refractive index and the profile of the connection end surfaces of the optical fibers are not restricted to those of the above embodiment. Further, the present invention is applicable not only to the case in which optical fibers are directly connected but also to a case in which optical fibers are connected by using a connector or the like.

The above embodiments should not be construed restrictively. The present invention allows various modifications without departing from the scope of the invention.

As described in detail above, the optical fiber end surface processing method, the processing apparatus for the method, the cutter for use in the method, and the plastic optical fiber connection method provide the following advantages:

(1) Apart from a convex semi-spherical surface, the plastic optical fiber end surface can be cut into an arbitrary profile such as a concave semi-spherical surface by changing the shape of the cutter.

(2) Thus, it is possible to form the optical fiber end surface into an optimum profile according to the use. For example, the light quantity can be condensed to a point or diffused as desired. Further, optical fibers can be connected with little reduction (loss) in light quantity. Further, by cutting one end surface of an optical fiber into a concave surface, and fitting a spherical member formed of another material into the concave portion, it is possible to change the refractive index of the end surface.

(3) When processing the end surface of a plastic optical fiber, not only the core portion but also the clad portion and the jacket can be selectively processed.

(4) Since shaping is effected by using a cutter (cutting tool), there is no need to prepare a heating means or a rapid cooling means as in the prior art, resulting a simple structure and low cost. The operation is easy, and anyone can perform end surface processing with ease.

(5) Since holders to which cutters for cutting the end surfaces of plastic optical fibers are attached are provided in parallel, it is possible to simultaneously cut the optical fiber end surfaces of a multiple plastic optical fiber. Thus, even in the case of a multiple plastic optical fiber, end surface processing can be performed efficiently.

(6) Since the end surface of a plastic optical fiber is cut in the through-hole of a holder, there is no positional deviation of the optical fiber, and it is possible to perform the cutting with the axes of the optical fiber and the cutter being in alignment with each other, making it possible to perform end surface processing in a desirable manner.

(7) The cutter of the present invention exhibits different cutting edge angles in correspondence with the components of an optical fiber, i.e., the core portion, the clad portion, and the jacket, and, in some cases, a connector. Thus, the cutting of an end surface can be performed in an appropriate fashion for different component materials, making it possible to accurately perform end surface shaping.

(8) When the cutter has a cutting edge only in one half thereof, the cutter can be produced easily and at low cost.

(9) In the optical fiber connecting portion, the connection end surface is formed as a concave or convex semi-spherical surface, so that it is possible to condense or diffuse incident light and outgoing light. Thus, in the optical fiber connecting portion, it is possible to prevent optical fiber transmission loss (reduction in light quantity), thus making it possible to prevent a deterioration in the transmission characteristic of the optical fiber. Further, since it is possible to condense or diffuse light, very little transmission loss is involved if there is a gap between the end surfaces of the optical fibers to be connected. In some cases, the presence of a gap results in a better transmission characteristic. Thus, the connection of the optical fibers is greatly facilitated, and the connecting operation is easy to perform.

(10) Further, in the optical fiber connecting portion, the connection end surface of the optical fiber is formed as a concave or convex semi-spherical surface, and a material of a different refractive index is provided at the semi-spherical end surface, so that the refractive index can be changed at the end surface, whereby it is possible to refract incident light and outgoing light in a predetermined direction or condense or diffuse the same. Thus, while in the prior art the positional relationship of the light emitting portion and light receiving portion is designed based on the refractive index of the optical fibers, the present invention allows change of refractive index at the end surface, thereby achieving an improvement in terms of degree of freedom in design.

What is claimed is:

1. A plastic optical fiber end surface processing method, comprising:

forming a through-hole in a holder;

inserting a semi-circular cutter halfway through into said through-hole from one side and rotating said cutter;

inserting a plastic optical fiber into said through-hole from the other side; and cutting at least a core portion of said plastic optical fiber end surface into a semi-spherical surface by said semi-circular cutter in said through-hole of said holder.

2. A plastic optical fiber end surface processing method according to claim 1, wherein said holder has a window open at a position where said plastic optical fiber end surface is cut by said semi-circular cutter.

3. A plastic optical fiber end surface processing method, according to claim 1, wherein said semi-circular cutter has one of convex and concave semi-circular shapes, and wherein said plastic optical fiber end surface is cut into one of convex and concave semi-spherical surfaces.

4. A plastic optical fiber end surface processing method according to claim 1, wherein said semi-circular cutter comprises one or a plurality of cutters formed into a semi-circular shape.

5. A plastic optical fiber end surface processing method according to claim 1, said method further comprising:

providing a motor with a motor driving shaft connected to said cutter directly or through a connection member.

6. A plastic optical fiber end surface processing method according to claim 5, wherein said connection member is a coupling connected to said motor driving shaft.

7. A plastic optical fiber end surface processing method according to claim 1, wherein, in a plastic optical fiber connection portion, an end surface of a plastic optical fiber is formed as a concave or convex semi-spherical surface, and wherein connection is effected with a material of a different refractive index being provided at this semi-spherical end surface.

8. A plastic optical fiber end surface processing method according to claim 7, wherein said material of a different refractive index is of a spherical or concave lens-like shape.

* * * * *